US012572013B2

(12) United States Patent
Nagatomi et al.

(10) Patent No.: US 12,572,013 B2
(45) Date of Patent: Mar. 10, 2026

(54) OPTICAL DEVICE

(71) Applicant: Panasonic Intellectual Property Management Co., Ltd., Osaka (JP)

(72) Inventors: Kenji Nagatomi, Osaka (JP); Norihiro Imamura, Osaka (JP); Hirofumi Hoshida, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 587 days.

(21) Appl. No.: 18/103,762

(22) Filed: Jan. 31, 2023

(65) Prior Publication Data

US 2023/0296890 A1 Sep. 21, 2023

(30) Foreign Application Priority Data

Mar. 17, 2022 (JP) ................................. 2022-042245
Aug. 26, 2022 (JP) ................................. 2022-135020

(51) Int. Cl.
*G02B 27/01* (2006.01)
*G02B 7/182* (2021.01)
*B32B 15/01* (2006.01)
*B60R 1/26* (2022.01)

(52) U.S. Cl.
CPC ......... *G02B 27/0101* (2013.01); *G02B 7/182* (2013.01); *G02B 27/01* (2013.01); *G02B 27/017* (2013.01); *G02B 27/0172* (2013.01); *B32B 15/016* (2013.01); *B32B 2551/00* (2013.01); *B60R 1/26* (2022.01); *B60R 2300/10* (2013.01); *B60R 2300/205* (2013.01)

(58) Field of Classification Search
None
See application file for complete search history.

(56) References Cited

U.S. PATENT DOCUMENTS 6,487,021 B1 * 11/2002 Ophey ............... G02B 27/0172
359/633
2002/0051254 A1 5/2002 Kaneko

FOREIGN PATENT DOCUMENTS

| JP | S62-99024 U | 6/1987 |
| JP | H10-268221 A | 10/1998 |
| JP | 2001-174741 A | 6/2001 |
| JP | 2017-049570 A | 3/2017 |
| JP | 2018-165782 A | 10/2018 |
| JP | 2021-107164 A | 7/2021 |
| JP | 2021-179458 A | 11/2021 |
| WO | 2017/203916 A1 | 11/2017 |

OTHER PUBLICATIONS

Office Action mailed on Sep. 5, 2023, for the corresponding Japanese patent application No. 2022-135020, together with an English translation thereof.

* cited by examiner

*Primary Examiner* — Dung T Nguyen
(74) *Attorney, Agent, or Firm* — Greenblum & Bernstein, P.L.C.

(57) ABSTRACT

An optical device includes: a display; an optical element that includes a first face and a second face facing the first face, the optical element receiving light from the display through the first face, reflecting the received light on the second face, and emitting the reflected light through the first face; a housing that accommodates the display and the optical element; and a fixing structure that fixes the optical element by holding the optical element from different sides of the optical element.

19 Claims, 23 Drawing Sheets

OPTICAL DEVICE

CROSS REFERENCE TO RELATED APPLICATIONS

The present application is based on and claims priority of Japanese Patent Application No. 2022-042245 filed on Mar. 17, 2022, and Japanese Patent Application No. 2022-135020 filed on Aug. 26, 2022.

FIELD

The present disclosure relates to optical devices.

BACKGROUND

An optical device is known to include an optical element that reflects light emitted from a display. As an example of such an optical device, Patent Literature (PTL) 1 discloses a head-up display device including an imaging unit and a virtual image optical system that causes light emitted from the imaging unit to be reflected by a windshield or a combiner to display a virtual image in the front of a vehicle.

CITATION LIST

Patent Literature

PTL 1: WO 2017/203916

SUMMARY

However, the head-up display device according to PTL 1 can be improved upon.

In view of this, the present disclosure provides an optical device capable of improving upon the above related art.

In accordance with an aspect of the present disclosure, an optical device includes: a display; an optical element that includes a first face and a second face facing the first face, the optical element receiving light from the display through the first face, reflecting the received light on the second face, and emitting the reflected light through the first face; a housing that accommodates the display and the optical element; and a fixing structure that fixes the optical element by holding the optical element from different sides of the optical element.

An optical device according to the aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2 is a schematic diagram of the optical device in FIG. 1.

FIG. 3 is a schematic diagram of an optical device according to Variation 1 of Embodiment 1.

FIG. 4 is a schematic diagram of an optical device according to Variation 2 of Embodiment 1.

FIG. 5 is a schematic diagram of an optical device according to Embodiment 2.

FIG. 6 is a schematic diagram of an optical device according to Embodiment 3.

FIG. 8 is a schematic diagram of an optical device according to Embodiment 5.

FIG. 10 is a schematic diagram of an optical device according to Embodiment 6.

FIG. 22 is a schematic diagram of an optical device according to Embodiment 18.

DESCRIPTION OF EMBODIMENTS

Figure 1:
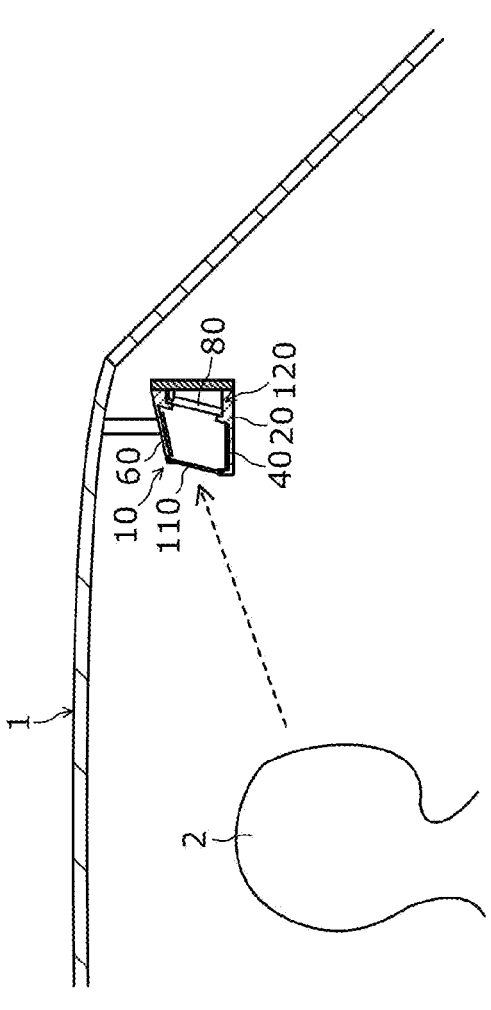
FIG. 1 is a schematic diagram of an optical device according to Embodiment 1 installed in a vehicle.

Here, in a case where an optical device includes an optical element fixed by press fitting or using adhesive and where light emitted from a display enters the optical element, is reflected by the optical element, and is then emitted from the optical element, deformation of the optical element caused by heat, vibration, and the like easily leads to damage to the optical element. This easily reduces the quality of the image displayed by the optical device.

In view of this, the present disclosure provides an optical device capable of preventing a reduction in the image quality.

In accordance with an aspect of the present disclosure, an optical device includes: a display; an optical element that includes a first face and a second face facing the first face, the optical element receiving light from the display through the first face, reflecting the received light on the second face, and emitting the reflected light through the first face; a housing that accommodates the display and the optical element; and a fixing structure that fixes the optical element by holding the optical element from different sides of the optical element.

With this, the optical element can be fixed by being held from different sides and thus is at less risk of damage compared with a case where the optical element is fixed by press fitting or using adhesive. This prevents a reduction in the quality of the image displayed by the optical device.

It is possible that the optical element includes a side face that links the first face and the second face, and the fixing structure includes a first face presser provided for the housing and at least one of a second face presser or a side face presser, the first face presser pressing an edge portion of the optical element from a side where the first face lies when the optical element is viewed from the side where the first face lies, the second face presser pressing the optical element from a side where the second face lies, the side face presser pressing the optical element from a side where the side face lies.

With this, the optical element can be fixed by being held between the first face presser and at least one of the second face presser or the side face presser. Moreover, the edge portion of the optical element can be covered by the first face presser when the optical element is viewed from the side where the first face lies. This prevents stray light, if any, coming from the edge portion from affecting the image displayed by the optical device, thereby preventing a reduction in the quality of the image displayed by the optical device.

It is also possible that the side face includes a first side portion and a second side portion that faces the first side portion, the fixing structure includes the side face presser, and the side face presser includes a first side portion presser that presses the optical element from a side where the first side portion lies and a second side portion presser that presses the optical element from a side where the second side portion lies.

With this, the optical element can be fixed by being held from different sides while damage to the second face that reflects light is prevented. This further prevents a reduction in the quality of the image displayed by the optical device.

It is further possible that the second side portion is inclined with respect to the first side portion to be away from the first side portion as the second side portion is closer to the first face than the second face, the first side portion presser presses the first side portion, and the second side portion presser presses the second side portion.

With this, when the first side portion and the second side portion are pressed, the optical element can also be pressed toward the first face from the side where the second face lies. Thus, the optical element can be fixed by being held by the first face presser, the first side portion presser, and the second side portion presser. Accordingly, the optical element can be fixed by being held from different sides while damage to the second face that reflects light is further prevented. This further prevents a reduction in the quality of the image displayed by the optical device.

It is still further possible that the first side portion is an upper face portion of the optical element when the optical element is viewed from the side where the first face lies, and the first side portion presser presses the first side portion from above the optical element when the optical element is viewed from the side where the first face lies.

With this, the first side portion presser protrudes downward to press the first side portion when the optical element is viewed from the side where the first face lies. This minimizes the depth of the first side portion presser, thereby reducing the depth of the housing.

It is still further possible that the first side portion is an upper face portion of the optical element when the optical element is viewed from the side where first face lies, the side face includes a third side portion and a fourth side portion, the third side portion being connected to a left end of the first side portion and located further leftward as the third side portion is closer to the second side portion when the optical element is viewed from the side where the first face lies, the fourth side portion being connected to a right end of the first side portion and located further rightward as the fourth side portion is closer to the second side portion when the optical element is viewed from the side where the first face lies, and the side face presser includes at least one of a third side portion presser that presses the third side portion from above the optical element when the optical element is viewed from the side where the first face lies or a fourth side portion presser that presses the fourth side portion from above the optical element when the optical element is viewed from the side where the first face lies.

With this, the third side portion presser protrudes downward to press the third side portion when the optical element is viewed from the side where the first face lies. This minimizes the depth of the third side portion presser, thereby reducing the depth of the housing. Moreover, the fourth side portion presser protrudes downward to press the fourth side portion when the optical element is viewed from the side where the first face lies. This minimizes the depth of the fourth side portion presser, thereby reducing the depth of the housing. Furthermore, the optical element can be easily fixed in all directions including the front-back, up-down, and left-right directions of the optical element when the optical element is viewed from the side where the first face lies. This eliminates or minimizes the effect of thermal expansion and vibration of the optical element in all directions on the image.

It is still further possible that the fixing structure includes the second face presser, and the second face presser is in surface contact with the second face to press the second face.

This prevents a pressing force from being concentrated on a part of the second face. Accordingly, the optical element can be fixed by being held (sandwiched) from different sides while damage to the second face that reflects light is prevented. This further prevents a reduction in the quality of the image displayed by the optical device.

It is still further possible that the first face presser includes three or more edge pressers each pressing an edge portion of the first face.

This prevents displacement of the optical element, thereby further preventing a reduction in the quality of the image displayed by the optical device.

It is still further possible that the first face presser presses an edge portion of the first face around an entire circumference of the first face.

This prevents displacement of the optical element, thereby further preventing a reduction in the quality of the image displayed by the optical device. Moreover, even if stray light is produced at the edge portion of the first face, the stray light can be prevented from affecting the image displayed by the optical device. This prevents a reduction in the quality of the image displayed by the optical device.

It is still further possible that the fixing structure includes the second face presser, and the first face presser and the second face presser mutually hold the optical element in directions in which the first face and the second face face each other.

This prevents deformation of the optical element caused when the optical element is held (sandwiched) from different sides, thereby further preventing a reduction in the quality of the image displayed by the optical device.

It is still further possible that at least one of the second face presser or the side face presser has flexibility.

This prevents damage to the optical element, thereby further preventing a reduction in the quality of the image displayed by the optical device.

It is still further possible that the fixing structure includes the second face presser, a member with a screw hole, and a screw that presses the second face presser toward the optical element while fitted in the screw hole, and the second face presser presses the optical element by being pressed toward the optical element by the screw.

This prevents displacement of the optical element, thereby further preventing a reduction in the quality of the image displayed by the optical device.

Moreover, the second face presser may be integral to the housing.

This prevents a reduction in the quality of the image displayed by the optical device while preventing an increase in the number of parts.

Moreover, a substrate held and fixed between the screw and the member while the screw is fitted in the screw hole may be provided.

This allows the substrate to be provided without an increase in the number of parts.

It is still further possible that the fixing structure includes the second face presser, and the second face presser includes one edge presser that presses one edge portion of the second face, an other edge presser that presses an other edge portion of the second face, and a covering presser that presses the second face while covering the second face between the one edge presser and the other edge presser.

This prevents displacement of the optical element, thereby further preventing a reduction in the quality of the image displayed by the optical device.

It is still further possible that the optical element includes at least one of a first recess provided at an edge portion of the first face or a first protrusion provided at the edge portion of the first face, and the housing includes at least one of a second protrusion that engages with the first recess or a second recess that engages with the first protrusion.

With this, the optical element can be easily positioned relative to the housing. This easily prevents a reduction in the quality of the image displayed by the optical device.

It is still further possible that the housing includes a body that accommodates the optical element and cover that is attached to the body and covers the second face of the optical element, and at least one of the second face presser or the side face presser is provided for the cover.

With this, the optical element can be fixed by being held from different sides as the cover is attached to the body. This easily prevents a reduction in the quality of the image displayed by the optical device.

It is still further possible that the fixing structure includes the side face presser, and the side face presser includes an upper presser and at least one of a left presser or a right presser, the upper presser pressing the optical element using an elastic force from above, the left presser pressing the optical element using an elastic force from a left, the right presser pressing the optical element using an elastic force from a right, when the optical element is viewed from the side where the first face lies.

This prevents damage to the optical element even if, for example, the optical element expands, thereby further preventing a reduction in the quality of the image displayed by the optical device.

It is still further possible that the first face includes a curved portion and a flat portion connected to an edge portion of the curved portion, and the first face presser presses the flat portion.

With this, even if the first face includes the curved portion, the optical element can be fixed by being held (sandwiched) from different sides when the flat portion is pressed. This easily prevents a reduction in the quality of the image displayed by the optical device.

It is still further possible that the optical device further includes: a protecting member provided at at least one of a point between the first face and the first face presser, a point between the second face and the second face presser, or a point between the side face and the side face presser.

This prevents damage to the optical element, thereby further preventing a reduction in the quality of the image displayed by the optical device.

It is still further possible that the optical device further includes: a light absorbing member provided at least in a part of the side face.

This prevents the light entering the first face from being reflected from the side face, thereby further preventing a reduction in the quality of the image displayed by the optical device.

It is still further possible that the optical device further includes: a metallic multilayer including a plurality of laminated metallic layers and disposed on the second face.

With this, even if the outermost layer of the metallic multilayer breaks, the remaining metallic layers can prevent damage to the second face. In addition, the light entering the first face can be easily reflected from the second face. This further prevents a reduction in the quality of the image displayed by the optical device.

The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Moreover, in the following embodiments, terms such as "parallel" and "orthogonal" may be used to indicate relative orientations of two directions. These terms, however, may be different from the orientations in the strict sense. For example, an expression of "two directions are parallel" indicates not only that the two directions are exactly parallel but that the two directions are substantially parallel, that is, for example, there may be a difference of a few percent between the two directions unless otherwise noted.

Optical paths illustrated in the drawings in the following embodiments are given to indicate the principle concepts, and do not necessarily reflect actual optical paths.

Embodiment 1

FIG. 1 is a schematic diagram of optical device 10 according to Embodiment 1 installed in vehicle 1. In FIG. 1, vehicle 1 and housing 20 are illustrated in cross section.

As illustrated in FIG. 1, optical device 10 displays an image by reflecting light emitted from display 40. In this embodiment, optical device 10 is installed inside the cabin of vehicle 1. For example, optical device 10 displays an image captured by a camera that captures the image in the rear of vehicle 1. This allows driver 2 of vehicle 1 to visually check the state in the rear of vehicle 1 by looking at optical device 10 (see a broken line arrow in FIG. 1).

Note that, for example, optical device 10 may display an image indicating the speed of vehicle 1, results of detection of an object approaching vehicle 1, information about navigation from the current location of vehicle 1 to the destination, or the like.

Figure 2:
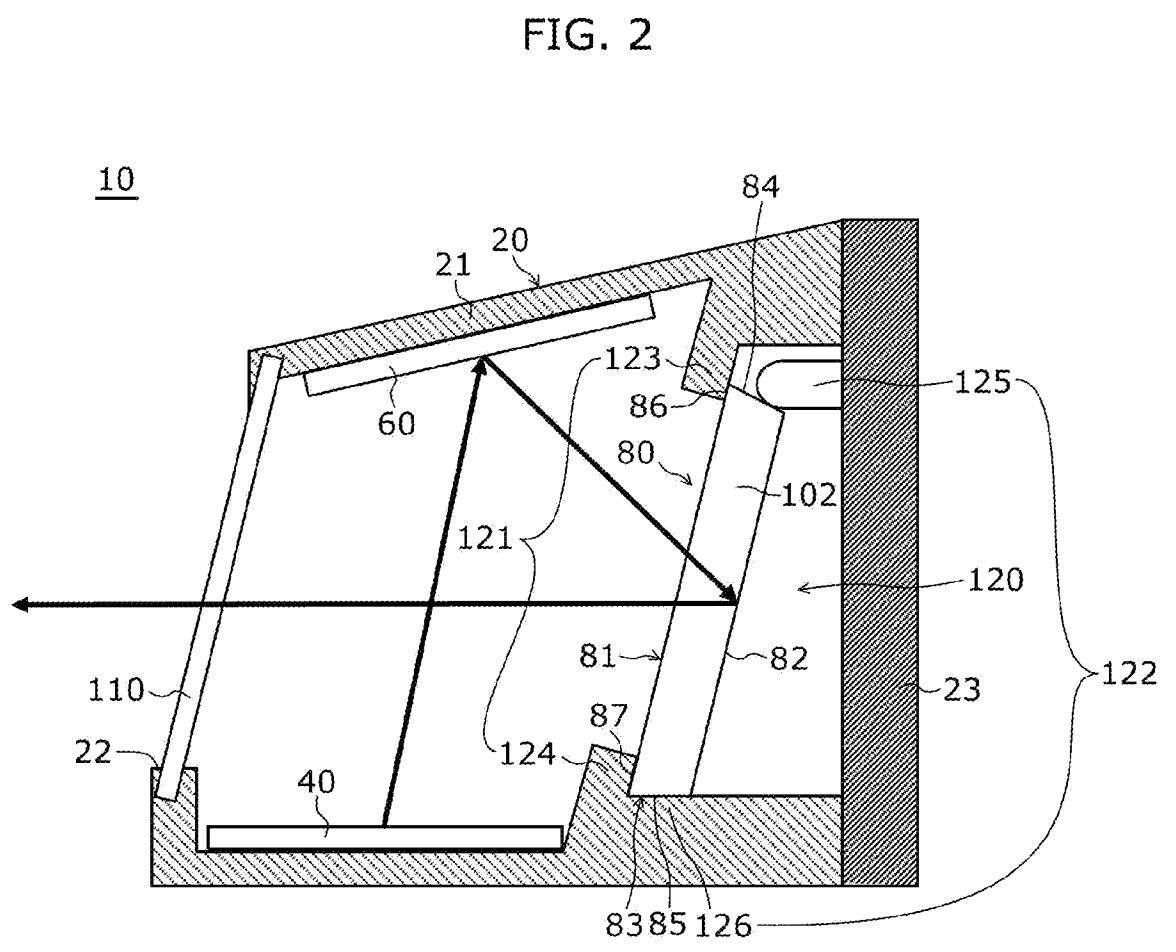

FIG. 2 is a schematic diagram of optical device 10 in FIG. 1. In FIG. 2, housing 20 and the like are illustrated in cross section.

As illustrated in FIG. 2, optical device 10 includes housing 20, display 40, reflective mirror 60, optical element 80, light-transmitting cover 110, and fixing structure 120.

Housing 20 accommodates display 40, reflective mirror 60, and optical element 80. In this embodiment, housing 20 is suspended from the roof of vehicle 1. Housing 20 includes body 21, emission portion 22, and cover 23.

Body 21 accommodates display 40, reflective mirror 60, and optical element 80.

Emission portion 22 allows light emitted from display 40 to be guided to the outside of housing 20. In this embodiment, emission portion 22 is provided such that light is emitted from display 40, then reflected from reflective mirror 60 to enter optical element 80, and reflected from optical element 80 to be emitted from optical element 80 through emission portion 22. Emission portion 22 is a through-hole that connects the spaces inside and outside body 21.

Cover 23 is attached to body 21 to cover second face 82 of optical element 80. That is, cover 23 covers second face 82 of optical element 80 when it is attached to body 21. In this embodiment, cover 23 is attached to body 21 with screws 24 (see FIG. 8, for example). Note that, for example, cover 23 may be attached to body 21 by engaging with body 21.

Display 40 radiates light representing an image. For example, display 40 radiates light representing the image captured by the camera that captures the image in the rear of vehicle 1. For example, display 40 is implemented by including an LCD (Liquid Crystal Display), an organic EL (Electro Luminescence) display, or a micro LED (Light Emitting Diode) display.

Reflective mirror 60 reflects the light emitted from display 40 toward optical element 80. Specifically, reflective mirror 60 reflects the light emitted from display 40 toward first face 81 of optical element 80.

Optical element 80 includes first face 81, second face 82 that faces first face 81, and side face 83 that links first face 81 and second face 82. Optical element 80 is provided such that light is emitted from display 40, then enters optical element 80 through first face 81, and is reflected from second face 82 to be emitted from optical element 80 through first face 81. In this embodiment, the light emitted from display 40 is reflected by reflective mirror 60 to enter optical element 80 through first face 81. The light entering optical element 80 through first face 81 is reflected from second face 82 to be guided to the outside of optical element 80 through first face 81. The light guided to the outside of optical element 80 through first face 81 travels to the outside of housing 20 through emission portion 22 (see thick line arrows in FIG. 2).

First face 81 allows the light emitted from display 40 to enter and the light reflected from second face 82 to exit. In this embodiment, first face 81 is a flat surface. In this embodiment, first face 81 has a horizontally oblong shape when optical element 80 is viewed from a side where first face 81 lies.

Second face 82 reflects the light, emitted from display 40 and entering through first face 81, toward first face 81. In this embodiment, second face 82 is a flat surface. In this embodiment, second face 82 has a horizontally oblong shape when optical element 80 is viewed from the side where first face 81 lies. In this embodiment, second face 82 is slightly smaller than first face 81.

For example, second face 82 is parallel to first face 81. Note that, for example, second face 82 may be inclined with respect to first face 81 such that the thickness of an upper part of optical element 80 differs from the thickness of a lower part of optical element 80 when optical element 80 is viewed from the side where first face 81 lies.

Note that, for example, first face 81 may be a curved surface recessed toward second face 82, and second face 82 may be a curved surface protruding away from first face 81. That is, for example, first face 81 and second face 82 may be curved surfaces curved away from a side, of optical element 80, at which the light emitted from display 40 enters (away from the incident side). In this case, for example, first face 81 and second face 82 may be freeform surfaces using polynomial functions or the like.

Side face 83 links first face 81 and second face 82. Specifically, side face 83 is connected to the edge portion of first face 81 and the edge portion of second face 82 to link the edge portion of first face 81 and the edge portion of second face 82. Side face 83 has a ring shape along the edge portion of first face 81 and the edge portion of second face 82. Side face 83 includes first side portion 84, second side portion 85, third side portion 101 (see FIG. 8, for example), and fourth side portion 102.

In this embodiment, first side portion 84 in side face 83 links the upper edge portion of first face 81 and the upper edge portion of second face 82 when optical element 80 is viewed from the side where first face 81 lies. In this embodiment, first side portion 84 is an upper face portion of optical element 80 when optical element 80 is viewed from the side where first face 81 lies.

Second side portion 85 faces first side portion 84. In this embodiment, second side portion 85 links the lower edge portion of first face 81 and the lower edge portion of second face 82 when optical element 80 is viewed from the side where first face 81 lies. In this embodiment, second side portion 85 is a lower face portion of optical element 80 when optical element 80 is viewed from the side where first face 81 lies.

In this embodiment, second side portion 85 is inclined with respect to first side portion 84 to be away from first side portion 84 as second side portion 85 is closer to first face 81 than second face 82. That is, in this embodiment, first side portion 84 is inclined with respect to second side portion 85 to be away from second side portion 85 as first side portion 84 is closer to first face 81 than second face 82.

Third side portion 101 is connected to the left end of first side portion 84 and located further leftward as third side portion 101 is closer to second side portion 85 when optical element 80 is viewed from the side where first face 81 lies. In this embodiment, third side portion 101 is curved.

Fourth side portion 102 is connected to the right end of first side portion 84 and located further rightward as fourth side portion 102 is closer to second side portion 85 when optical element 80 is viewed from the side on which first face 81 lies. In this embodiment, fourth side portion 102 is curved.

For example, optical element 80 is made of light-transmitting resin or a light-transmitting material, such as glass.

Light-transmitting cover 110 is disposed at emission portion 22 and allows the light emitted from optical element 80 to pass therethrough. Specifically, light-transmitting cover 110 is disposed at emission portion 22 and allows the light emitted through first face 81 of optical element 80 to pass therethrough. For example, light-transmitting cover 110 is made of light-transmitting glass or light-transmitting resin.

Fixing structure 120 fixes optical element 80 by holding optical element 80 from different sides. Fixing structure 120 includes first face presser 121 and side face presser 122.

First face presser 121 is provided for housing 20 and presses the edge portion of optical element 80 from the side where first face 81 lies when optical element 80 is viewed from the side where first face 81 lies. In this embodiment, first face presser 121 presses the edge portion of first face 81. In this embodiment, first face presser 121 is in contact with the edge portion of first face 81. Note that, for example, first face presser 121 may not be in contact with the edge portion of first face 81 and may press the edge portion of first face 81 through other members. First face presser 121 includes one edge presser 123 and other edge presser 124.

One edge presser 123 presses one edge portion 86 of first face 81. In this embodiment, one edge presser 123 is in contact with edge portion 86. In this embodiment, edge portion 86 is the upper edge portion of first face 81 when optical element 80 is viewed from the side where first face 81 lies. In this embodiment, one edge presser 123 is integral to body 21 and protrudes downward from the inner surface of body 21 when optical element 80 is viewed from the side where first face 81 lies.

Other edge presser 124 presses other edge portion 87 of first face 81. In this embodiment, other edge presser 124 is in contact with edge portion 87. In this embodiment, edge portion 87 is the lower edge portion of first face 81 when optical element 80 is viewed from the side where first face 81 lies. In this embodiment, other edge presser 124 is integral to body 21 and protrudes upward from the inner surface of body 21 when optical element 80 is viewed from the side where first face 81 lies.

Side face presser 122 presses optical element 80 from a side where side face 83 lies. In this embodiment, side face presser 122 presses side face 83. In this embodiment, side face presser 122 is in contact with side face 83. Note that, for example, side face presser 122 may not be in contact with side face 83 and may press side face 83 through other members. Side face presser 122 includes first side portion presser 125 and second side portion presser 126.

First side portion presser 125 presses optical element 80 from a side where first side portion 84 lies. In this embodiment, first side portion presser 125 is in contact with first side portion 84 and presses first side portion 84.

In this embodiment, first side portion presser 125 is provided for cover 23. For example, first side portion presser 125 is integral to cover 23. First side portion presser 125 protrudes toward optical element 80 and presses first side portion 84 as cover 23 is attached to body 21.

For example, first side portion presser 125 has flexibility. Specifically, for example, first side portion presser 125 has flexibility higher than that of optical element 80. That is, for example, first side portion presser 125 is more flexible than optical element 80. For example, a part of first side portion presser 125 brought into contact with optical element 80 is formed of a flexible member. Moreover, for example, first side portion presser 125 is composed of a flexible member. For example, the flexible member is more flexible than optical element 80 and is made of rubber, fabric, or the like.

Second side portion presser 126 presses optical element 80 from a side where second side portion 85 lies. In this embodiment, second side portion presser 126 is in contact with second side portion 85 and presses second side portion 85.

In this embodiment, second side portion presser 126 is provided for body 21 and is integral to body 21.

In this embodiment, optical element 80 can be held between first side portion presser 125 and second side portion presser 126 from the sides where side face 83 lies. Moreover, in this embodiment, second side portion 85 is inclined with respect to first side portion 84 to be away from first side portion 84 as second side portion 85 is closer to first face 81 than second face 82. Accordingly, when first side portion 84 and second side portion 85 are respectively pressed by first side portion presser 125 and second side portion presser 126, optical element 80 is also pressed toward first face 81. Thus, optical element 80 can be held by one edge presser 123 and other edge presser 124 and by first side portion presser 125 and second side portion presser 126. In this manner, fixing structure 120 in this embodiment fixes optical element 80 by holding optical element 80n with one edge presser 123 and other edge presser 124 and with first side portion presser 125 and second side portion presser 126.

Optical device 10 according to Embodiment 1 has been described above.

As described above, optical device 10 according to Embodiment 1 includes display 40, optical element 80 including first face 81 and second face 82 that faces first face 81, housing 20 accommodating display 40 and optical element 80, and fixing structure 120 fixing optical element 80 by holding optical element 80. Light is emitted from display 40, enters optical element 80 through first face 81, and then reflected from second face 82 to be emitted from optical element 80 through first face 81.

With this, optical element 80 can be fixed by being held from different sides and thus is at less risk of damage compared with a case where optical element 80 is fixed by press fitting or using adhesive. This prevents a reduction in the quality of the image displayed by optical device 10.

Moreover, optical element 80 includes side face 83 that links first face 81 and second face 82, and fixing structure 120 includes first face presser 121 provided for housing 20 and side face presser 122. When optical element 80 is viewed from the side where first face 81 lies, first face presser 121 presses the edge portion of optical element 80 from the side where first face 81 lies, and side face presser 122 presses optical element 80 from the side where side face 83 lies.

With this, optical element 80 can be held and fixed between first face presser 121 and side face presser 122. Moreover, the edge portion of optical element 80 can be covered by first face presser 121 when optical element 80 is viewed from the side where first face 81 lies. This prevents stray light, if any, coming from the edge portion from affecting the image displayed by optical device 10, thereby preventing a reduction in the quality of the image displayed by optical device 10.

Moreover, side face 83 includes first side portion 84 and second side portion 85 that faces first side portion 84, and fixing structure 120 includes side face presser 122. Side face presser 122 includes first side portion presser 125 that presses optical element 80 from the side where first side portion 84 lies and second side portion presser 126 that presses optical element 80 from the side where second side portion 85 lies.

With this, optical element 80 can be held from different sides to be fixed while damage to second face 82 that reflects light is prevented. This further prevents a reduction in the quality of the image displayed by optical device 10.

Moreover, second side portion 85 is inclined with respect to first side portion 84 to be away from first side portion 84 as second side portion 85 is closer to first face 81 than second face 82, and first side portion presser 125 and second side portion presser 126 respectively press first side portion 84 and second side portion 85.

With this, when first side portion 84 and second side portion 85 are pressed, optical element 80 is also pressed toward first face 81 from a side where second face 82 lies. Thus, optical element 80 can be held and fixed among first face presser 121, first side portion presser 125, and second side portion presser 126. Accordingly, optical element 80 can be held from different sides to be fixed while damage to second face 82 that reflects light is further prevented. This further prevents a reduction in the quality of the image displayed by optical device 10.

Moreover, housing 20 includes body 21 that accommodates optical element 80 and cover 23 that is attached to body 21 to cover second face 82 of optical element 80, and cover 23 is provided with side face presser 122.

With this, optical element 80 can be held from different sides to be fixed as cover 23 is attached to body 21. This easily prevents a reduction in the quality of the image displayed by optical device 10.

Variation 1

Figure 3:
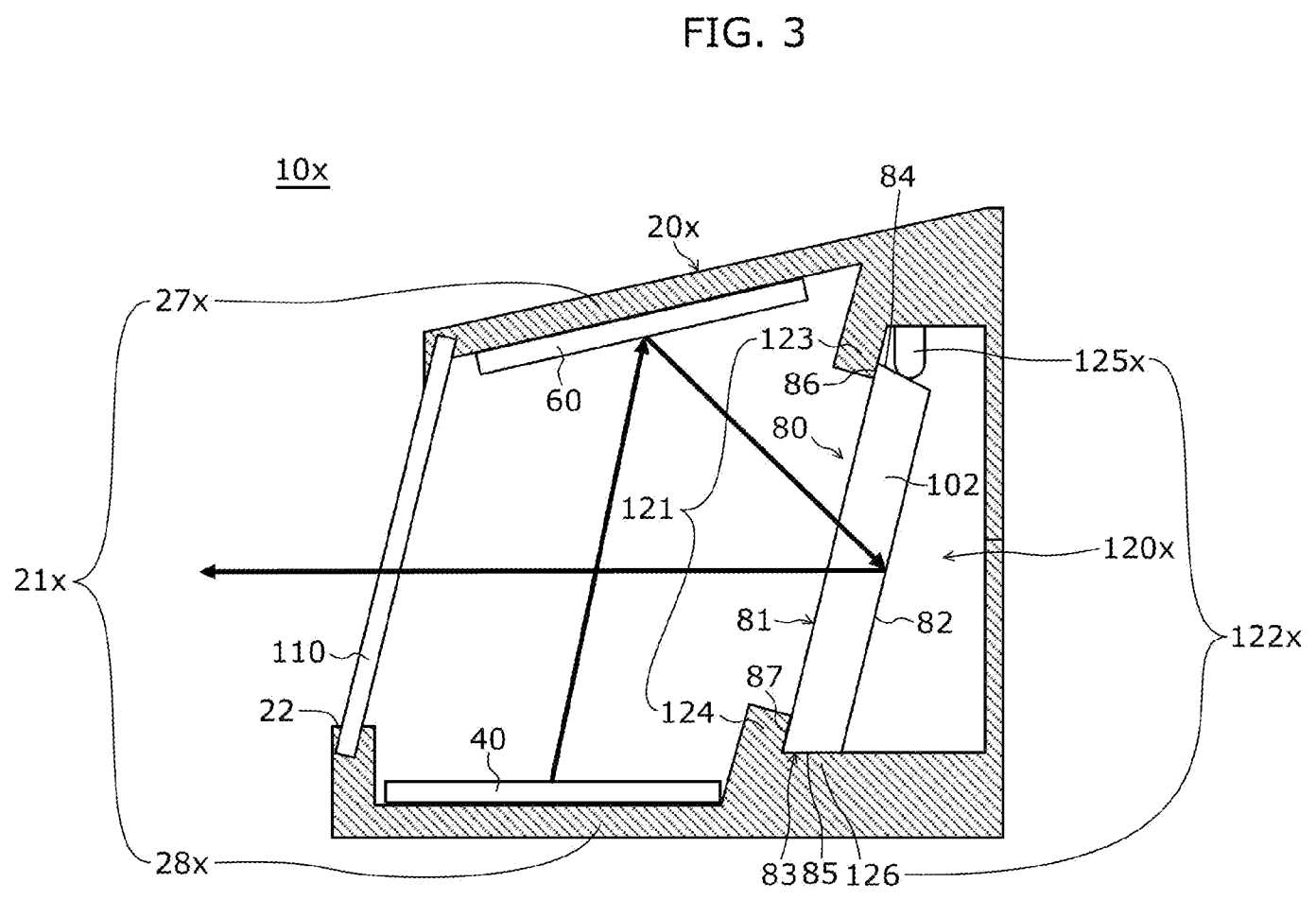

FIG. 3 is a schematic diagram of optical device 10x according to Variation 1 of Embodiment 1. Note that, in Variation 1, elements identical to those in Embodiment 1 will be referenced by the same designators, and the detailed explanations will be omitted. The distinctive configuration in Variation 1 is that housing 20x is dividable in the vertical direction in FIG. 3 and that first side portion presser 125x is disposed on the upper half of housing 20x.

Optical device 10x includes housing 20x instead of housing 20 and fixing structure 120x instead of fixing structure 120. Housing 20x does not include cover 23, and body 21x of housing 20x includes first member 27x, which is an upper part, and second member 28x, which is a lower part. Side face presser 122x of fixing structure 120x includes first side portion presser 125x instead of first side portion presser 125.

Specifically, first, in FIG. 3, housing 20x is vertically dividable into an upper part and a lower part substantially at its midsection in the height direction. That is, engaging the upper and lower parts of housing 20x (first member 27x and second member 28x) with each other forms the overall shape of housing 20x. Note that the upper and lower parts of housing 20x (first member 27x and second member 28x) may be fixed by, but not limited in particular to, screws (not illustrated), snap fitting, or bonding.

Optical element 80 is fixed by being held from different sides by housing 20x that can be vertically divided. For example, the upper part of housing 20x (first member 27x) is placed on the lower part of housing 20x (second member 28x) with optical element 80 fitted in the lower part. The upper and lower parts of housing 20x (first member 27x and second member 28x) are then fixed to each other. Thus, optical element 80 is fixed to housing 20x. At this moment, the upper part of housing 20x (first member 27x) is provided with first side portion presser 125x that has flexibility. First side portion presser 125x is disposed at a position where first side portion presser 125x abuts on first side portion 84 of optical element 80 when the upper part of housing 20x (first member 27x) is fixed to the lower part of housing 20x (second member 28x). Accordingly, fixing the upper part of housing 20x (first member 27x) to the lower part of housing 20x (second member 28x) with optical element 80 fitted in the lower part of housing 20x (second member 28x) causes first side portion presser 125x to abut on first side portion 84. This fixes optical element 80 to housing 20x. In this manner, first side portion presser 125x presses first side portion 84 from above optical element 80 when optical element 80 is viewed from the side where first face 81 lies.

Here, first side portion 84 is inclined with respect to both the lateral direction (that is, the front-back direction of housing 20x) and the vertical direction (that is, the height direction of housing 20x) in FIG. 3. Accordingly, when first side portion presser 125x abuts on first side portion 84, optical element 80 receives a pressing force perpendicular to the inclined surface of first side portion 84. The pressing force is divided into components acting in the front-back direction and the height direction of housing 20x. As a result, optical element 80 is held by first side portion presser 125x in the front-back direction and the height direction of housing 20x. Accordingly, thermal expansion of optical element 80 and vibration of the vehicle in the front-back direction and the height direction are absorbed by first side portion presser 125x that has flexibility.

Furthermore, first side portion presser 125x is disposed substantially parallel to the height direction of housing 20x. This reduces the depth of housing 20x compared with the configuration in which first side portion presser 125 is disposed substantially parallel to the front-back direction of housing 20 as illustrated in FIG. 2.

Optical device 10x according to Variation 1 has been described above.

As described above, in optical device 10x according to Variation 1, first side portion 84 is the upper face portion of optical element 80 when optical element 80 is viewed from the side where first face 81 lies, and first side portion presser 125x presses first side portion 84 from above optical element 80 when optical element 80 is viewed from the side where first face 81 lies.

With this, first side portion presser 125x protrudes downward to press first side portion 84 when optical element 80 is viewed from the side where first face 81 lies. This minimizes the depth of first side portion presser 125x, thereby reducing the depth of housing 20x.

Furthermore, the thermal expansion of optical element 80 and the vibration of the vehicle in the front-back direction and the height direction of housing 20x are absorbed by first side portion presser 125x. This eliminates or minimizes the effect on the image.

Variation 2

Figure 4:
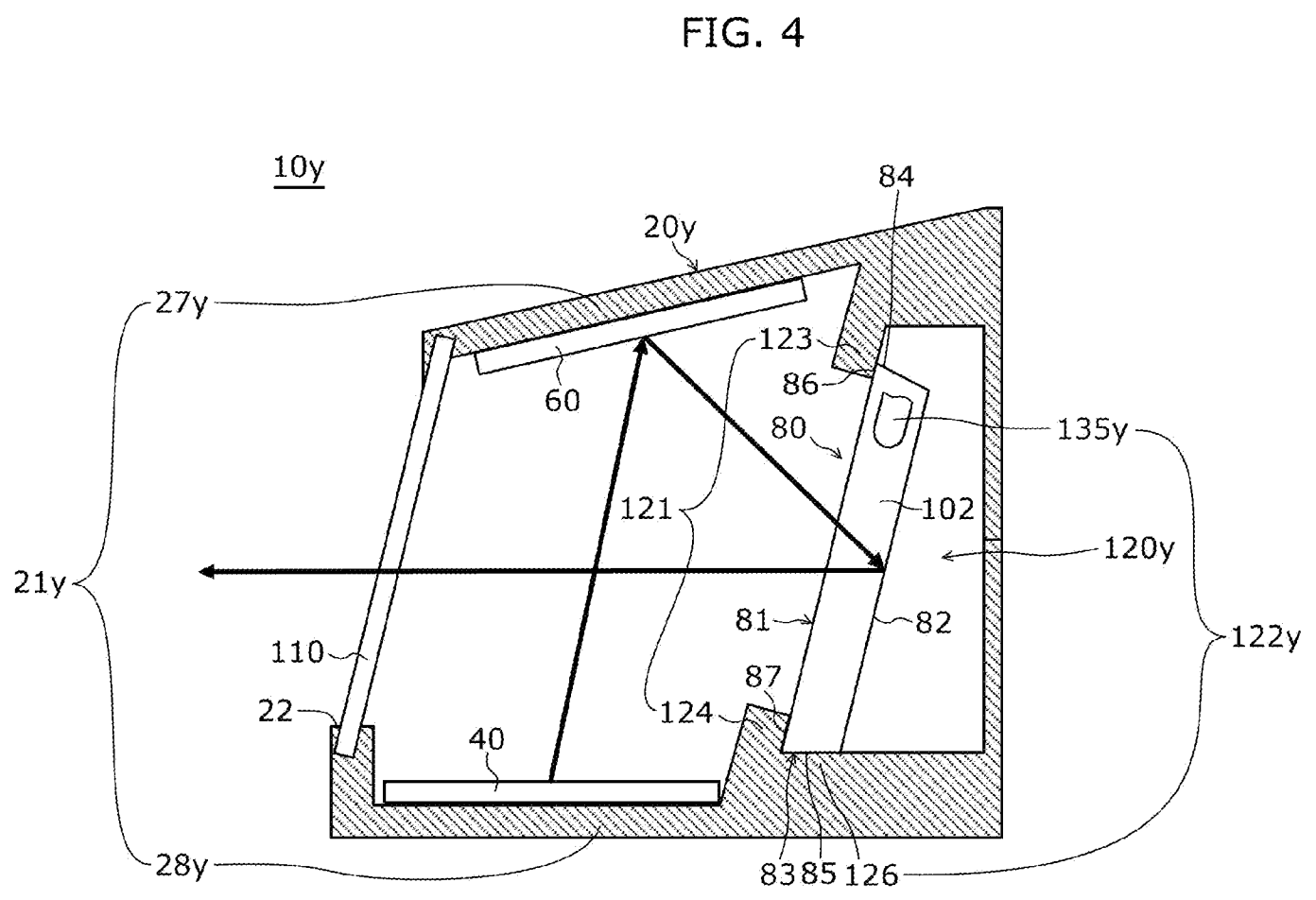

FIG. 4 is a schematic diagram of optical device 10y according to Variation 2 of Embodiment 1. Note that, in Variation 2, elements identical to those in Embodiment 1 will be referenced by the same designators, and the detailed explanations will be omitted. The distinctive configuration in Variation 2 is that housing 20y is dividable in the vertical direction in FIG. 4 and that a third side portion presser (not illustrated) disposed on the upper half of housing 20y presses third side portion 101 from above optical element 80 while fourth side portion presser 135y disposed on the upper half of housing 20y presses fourth side portion 102 from above optical element 80.

Optical device 10y includes housing 20y instead of housing 20 and fixing structure 120y instead of fixing structure 120. Housing 20y does not include cover 23, and body 21y of housing 20y includes first member 27y, which is an upper part, and second member 28y, which is a lower part. Side face presser 122y of fixing structure 120y includes the third side portion presser and fourth side portion presser 135y instead of first side portion presser 125. Note that, for example, side face presser 122y may further include first side portion presser 125x. The third side portion presser is symmetrical with fourth side portion presser 135y when optical element 80 is viewed from the side where first face 81 lies.

Specifically, first, the configuration in which housing 20y is vertically dividable and a method of fixing both parts (first member 27y and second member 28y) are identical to those of housing 20x in Variation 1. Next, the configuration in which optical element 80 is held and fixed between the upper and lower parts of housing 20y is also the same as that in Variation 1. In Variation 2, however, the third side portion presser with flexibility abuts on third side portion 101 of optical element 80, and fourth side portion presser 135y with flexibility abuts on fourth side portion 102 of optical element 80. Note that, for example, third side portion 101 can be defined as a part, under the upper end, extending from the upper end to the left end of optical element 80 when optical element 80 is viewed from the side where first face 81 lies, whereas fourth side portion 102 can be defined as a part, under the upper end, extending from the upper end to the right end of optical element 80 when optical element 80 is viewed from the side where first face 81 lies. In other words, third side portion 101 and fourth side portion 102 are diagonally upper parts when optical element 80 is viewed from the side where first face 81 lies.

Here, third side portion 101 and fourth side portion 102 are inclined with respect to both the front-back direction and the height direction of housing 20y in FIG. 4 and also to the left-right direction (direction perpendicular to the page in FIG. 4) when optical element 80 is viewed from the side where first face 81 lies. Accordingly, when the third side portion presser abuts on third side portion 101, optical element 80 receives a pressing force perpendicular to the inclined surface of third side portion 101. Moreover, when fourth side portion presser 135y abuts on fourth side portion 102, optical element 80 receives a pressing force perpendicular to the inclined surface of fourth side portion 102. These pressing forces are divided into components acting in the front-back direction, the height direction, and the left-right direction of housing 20y. As a result, optical element 80 is held by the third side portion presser and fourth side portion presser 135y in the front-back direction, the height direction, and the left-right direction of housing 20y. Accordingly, thermal expansion of optical element 80 and vibration of the vehicle in the front-back direction, the height direction, and the left-right direction are absorbed by the third side portion presser and fourth side portion presser 135y that have flexibility.

Furthermore, as illustrated in FIG. 4, fourth side portion presser 135y is slightly inclined with respect to the height direction of housing 20y. This reduces the depth of housing 20y compared with the configuration in which first side portion presser 125 is disposed substantially parallel to the front-back direction of housing 20 as illustrated in FIG. 2. The same applies to the third side portion presser.

Optical device 10y according to Variation 2 has been described above.

As described above, in optical device 10y according to Variation 2, first side portion 84 is the upper face portion of optical element 80 when optical element 80 is viewed from the side where first face 81 lies. Side face 83 includes third side portion 101 and fourth side portion 102. Third side portion 101 is connected to the left end of first side portion 84 and located further leftward as third side portion 101 is closer to second side portion 85 when optical element 80 is viewed from the side where first face 81 lies, whereas fourth side portion 102 is connected to the right end of first side portion 84 and located further rightward as fourth side portion 102 is closer to second side portion 85 when optical element 80 is viewed from the side where first face 81 lies. Side face presser 122y includes at least one of the third side portion presser that presses third side portion 101 from above optical element 80 when optical element 80 is viewed from the side where first face 81 lies or fourth side portion presser 135y that presses fourth side portion 102 from above optical element 80 when optical element 80 is viewed from the side where first face 81 lies.

With this, the third side portion presser protrudes downward to press third side portion 101 when optical element 80 is viewed from the side where first face 81 lies. This minimizes the depth of the third side portion presser, thereby reducing the depth of housing 20y. Moreover, fourth side portion presser 135y protrudes downward to press fourth side portion 102 when optical element 80 is viewed from the side where first face 81 lies. This minimizes the depth of fourth side portion presser 135y, thereby reducing the depth of housing 20y. Furthermore, optical element 80 can be easily fixed in all directions including the front-back, up-down, and left-right directions of optical element 80 when optical element 80 is viewed from the side where first face 81 lies. This eliminates or minimizes the effect of the thermal expansion and vibration of optical element 80 in all directions on the image.

Note that the configuration is not limited to that in which third side portion presser abuts on third side portion 101 of optical element 80 while fourth side portion presser 135y abuts on fourth side portion 102 of optical element 80, and only the third side portion presser or fourth side portion presser 135y may be provided. Also in this case, the effect of the thermal expansion and vibration of optical element 80 in all directions on the image can be eliminated or minimized.

Embodiment 2

Figure 5:
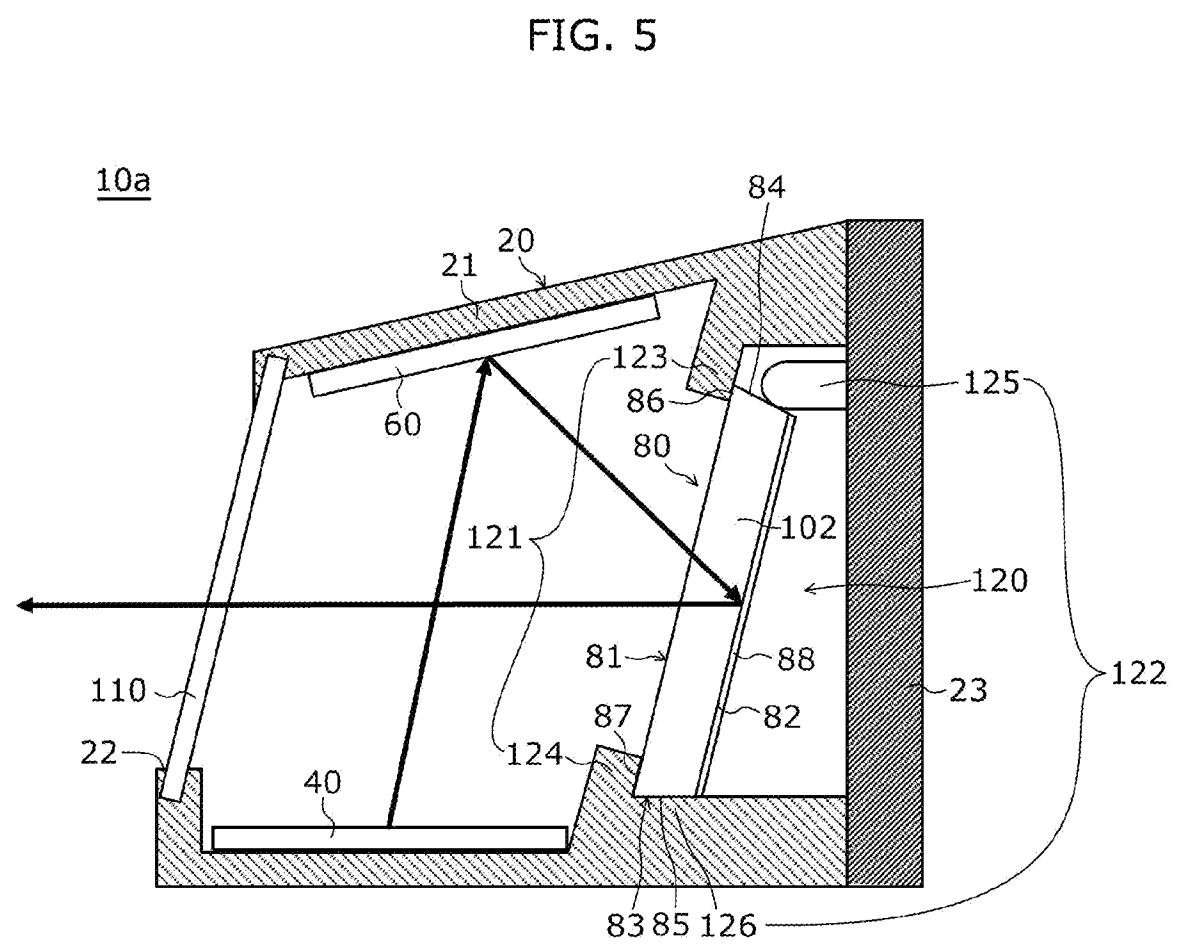

FIG. 5 is a schematic diagram of optical device 10a according to Embodiment 2. In FIG. 5, housing 20 and the like are illustrated in cross section. Optical device 10a mainly differs from optical device 10 in further including metallic multilayer 88.

Metallic multilayer 88 is a reflective member for facilitating reflection of light from second face 82. Metallic multilayer 88 is formed on second face 82. In this embodiment, metallic multilayer 88 is formed on the entire surface of second face 82. Metallic multilayer 88 includes a plurality of laminated metallic layers. For example, the plurality of metallic layers include aluminum layers or the like.

Optical device 10a according to Embodiment 2 has been described above.

As described above, optical device 10a according to Embodiment 2 includes metallic multilayer 88 including the plurality of laminated metallic layers and formed on second face 82.

With this, even if the outermost layer of metallic multilayer 88 breaks, the remaining metallic layers can prevent damage to second face 82. In addition, the light entering first face 81 can be easily reflected from second face 82. This further prevents a reduction in the quality of the image displayed by optical device 10a.

Embodiment 3

Figure 6:
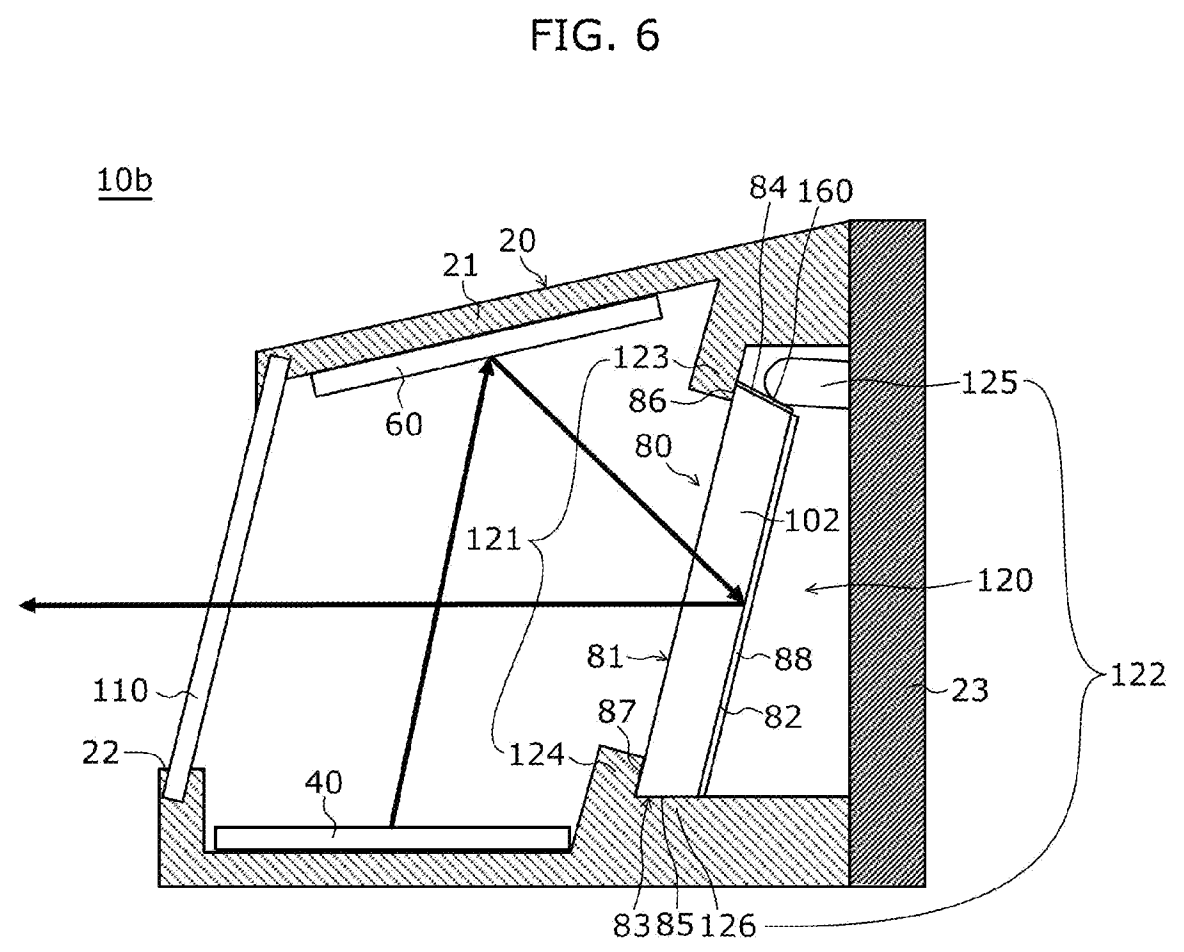

FIG. 6 is a schematic diagram of optical device 10b according to Embodiment 3. In FIG. 6, housing 20 and the like are illustrated in cross section. Optical device 10b mainly differs from optical device 10a in further including protecting member 160.

As illustrated in FIG. 6, protecting member 160 is disposed between first side portion presser 125 and first side portion 84. Protecting member 160 protects optical element 80. In this embodiment, protecting member 160 prevents first side portion presser 125 from coming into direct contact with first side portion 84 to protect first side portion 84. For example, protecting member 160 is more flexible than optical element 80 and first side portion presser 125, and is made of rubber, fabric, or the like.

For example, protecting member 160 may be disposed between second side portion presser 126 and second side portion 85 and between first face 81 and first face presser 121.

Moreover, for example, optical device 10*b* may not be provided with metallic multilayer 88.

Optical device 10*b* according to Embodiment 3 has been described above.

As described above, optical device 10*b* according to Embodiment 3 includes protecting member 160 disposed between side face 83 (first side portion 84) and side face presser 122 (first side portion presser 125).

This prevents damage to optical element 80, thereby further preventing a reduction in the quality of the image displayed by optical device 10*b*.

Embodiment 4

Figure 7:
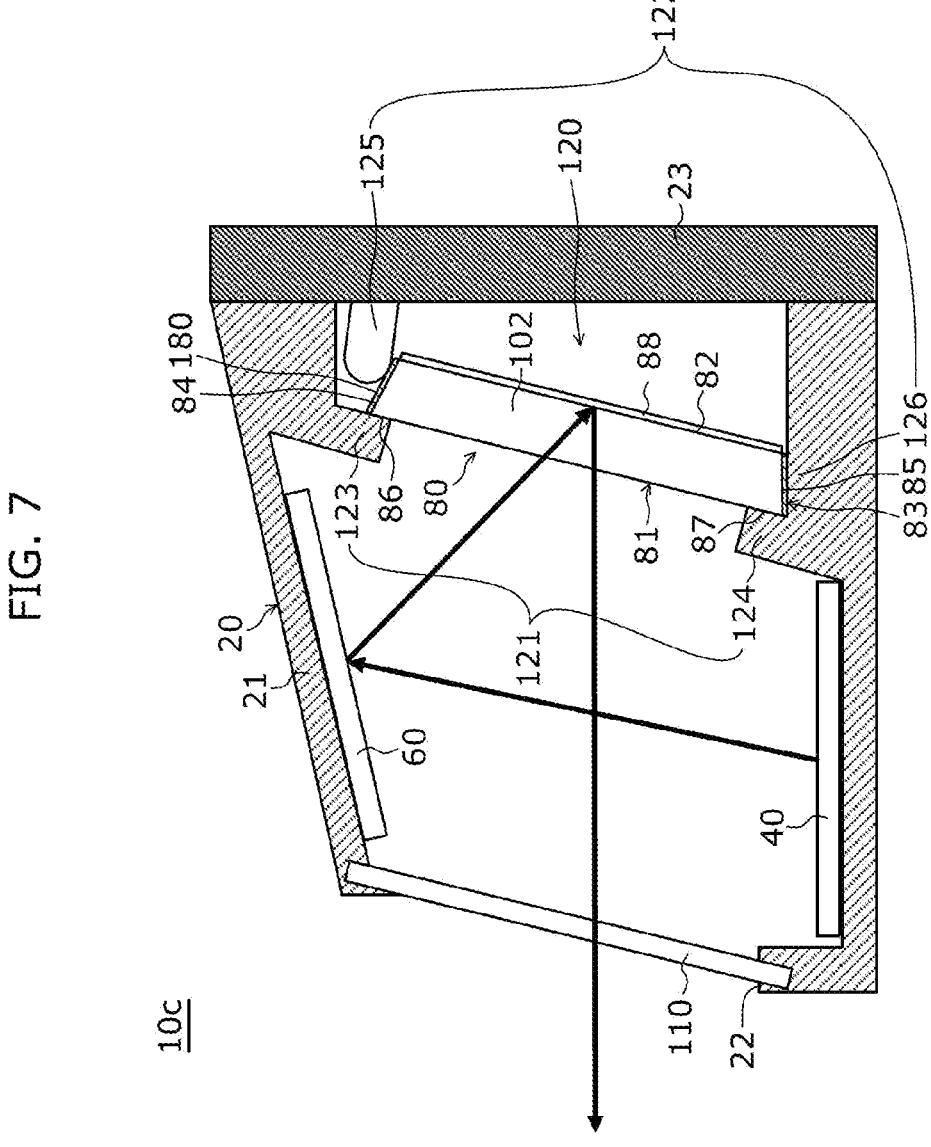
FIG. 7 is a schematic diagram of an optical device according to Embodiment 4.

FIG. 7 is a schematic diagram of optical device 10*c* according to Embodiment 4. In FIG. 7, housing 20, light absorbing member 180, and the like are illustrated in cross section. Optical device 10*c* mainly differs from optical device 10*a* in further including light absorbing member 180.

As illustrated in FIG. 7, light absorbing member 180 is disposed on side face 83. In this embodiment, light absorbing member 180 is disposed on the entire circumference of side face 83. Light absorbing member 180 absorbs light. For example, the color of light absorbing member 180 is black.

Note that, for example, light absorbing member 180 may not be disposed on the entire circumference of side face 83 but only on a part of side face 83.

Moreover, for example, optical device 10*c* may not be provided with metallic multilayer 88.

Optical device 10*c* according to Embodiment 4 has been described above.

As described above, optical device 10*c* according to Embodiment 4 includes light absorbing member 180 disposed at least on a part of side face 83.

This prevents the light entering first face 81 from being reflected from side face 83, thereby further preventing a reduction in the quality of the image displayed by optical device 10*c*.

Embodiment 5

Figure 8:
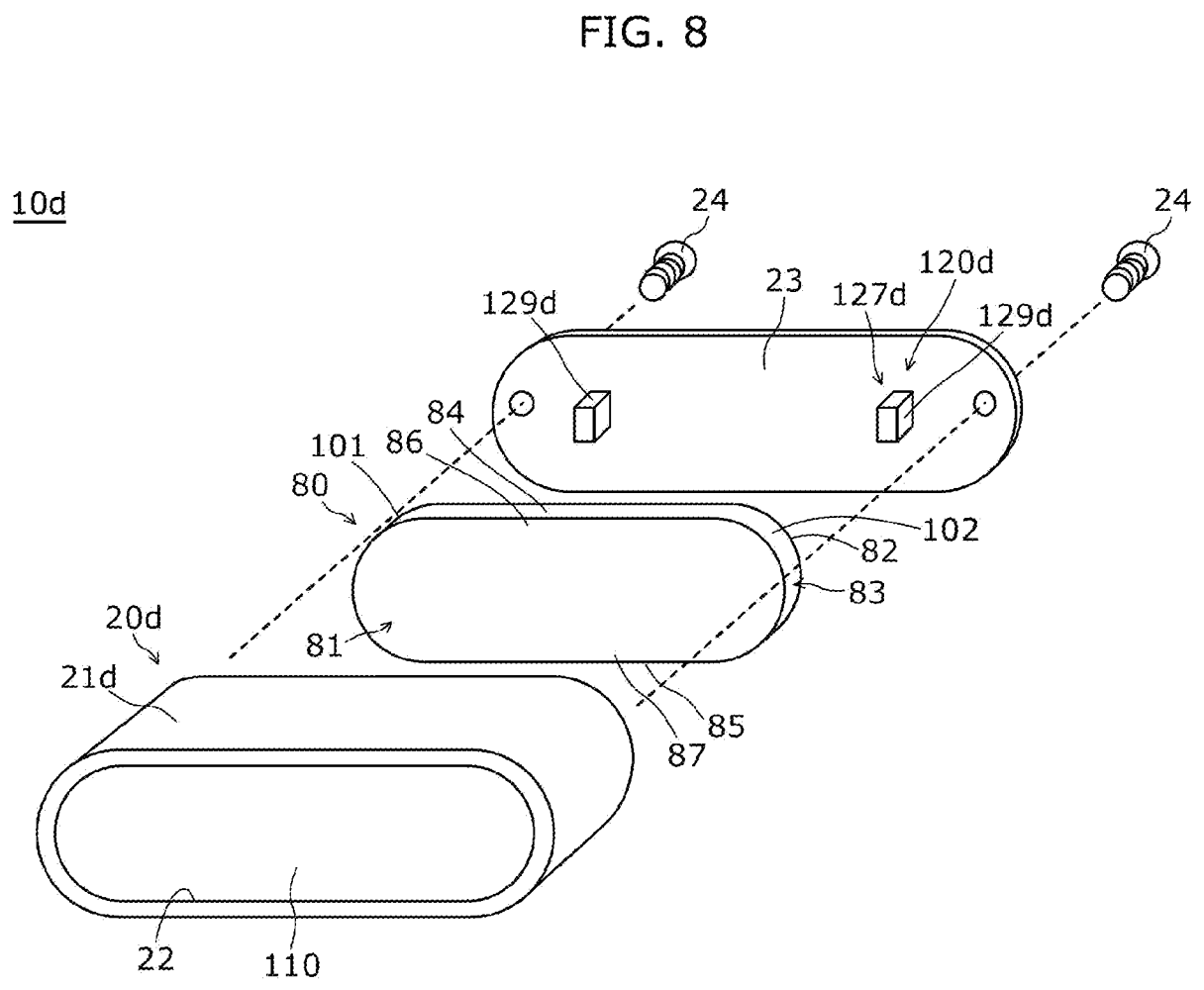
Figure 9:
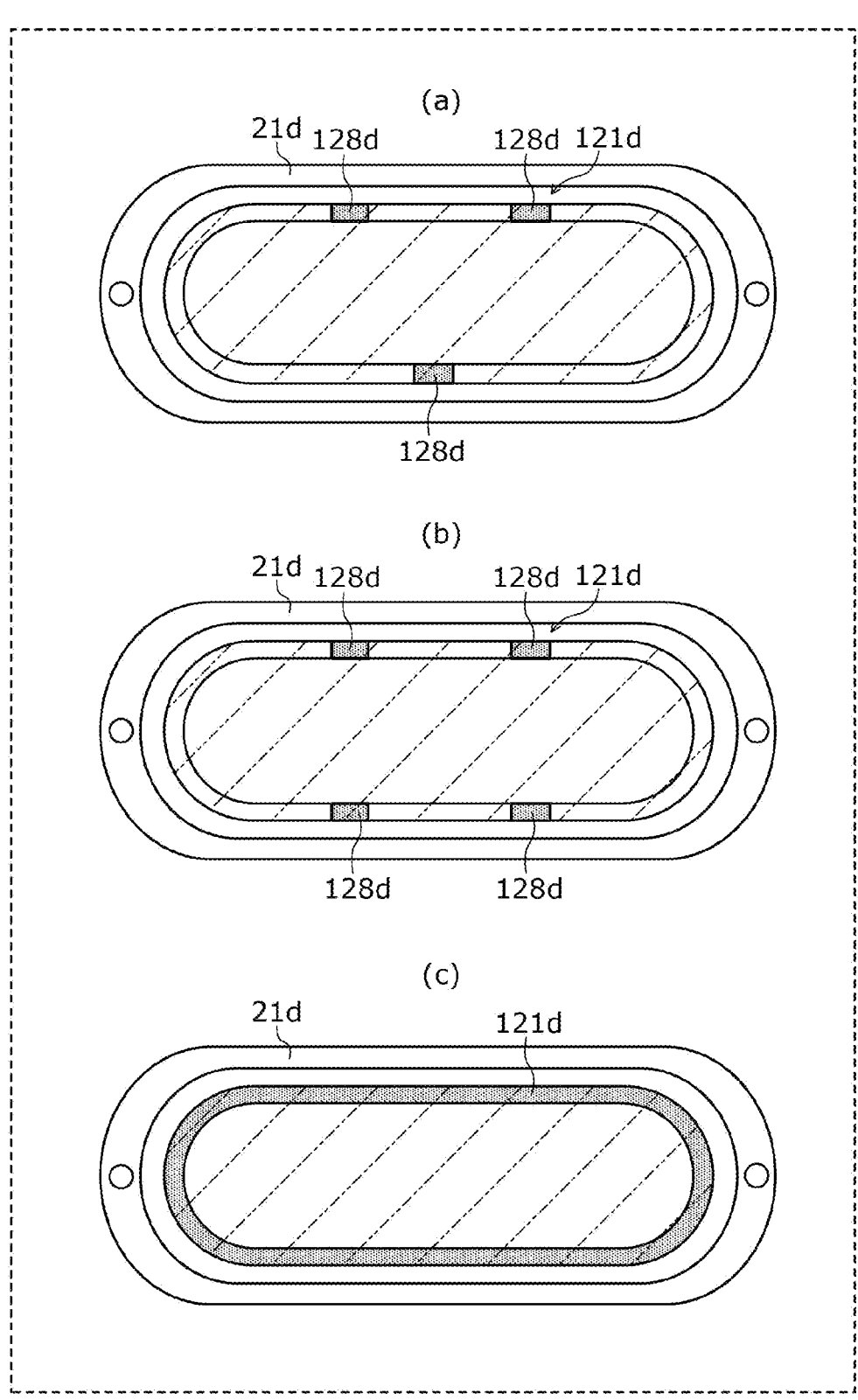
FIG. 9 is a schematic diagram illustrating examples of a first face presser in the optical device in FIG. 8.

FIG. 8 is a schematic diagram of optical device 10*d* according to Embodiment 5. Specifically, FIG. 8 is an exploded perspective view of optical device 10*d*. FIG. 9 is a schematic view illustrating examples of first face presser 121*d* in optical device 10*d* in FIG. 8. FIG. 9 illustrates the interior of body 21*d* of housing 20*d* viewed from a side where cover 23 lies. FIG. 9 illustrates three examples of first face presser 121*d*. Note that the parts hatched with dash-dot-dot lines in FIG. 9 indicate portions in which optical element 80 is accommodated. Optical device 10*d* mainly differs from optical device 10 in including housing 20*d* instead of housing 20 and fixing structure 120*d* instead of fixing structure 120.

As illustrated in FIG. 8, housing 20*d* mainly differs from housing 20 in including body 21*d* instead of body 21.

As illustrated in FIGS. 8 and 9, fixing structure 120*d* mainly differs from fixing structure 120 in including first face presser 121*d* instead of first face presser 121, in not including side face presser 122, and in including second face presser 127*d*.

As illustrated in FIG. 9, first face presser 121*d* is provided for body 21*d* of housing 20*d* and presses the edge portion of optical element 80 from the side where first face 81 lies when optical element 80 is viewed from the side where first face 81 lies.

As illustrated in (a) in FIG. 9, for example, first face presser 121*d* includes three edge pressers 128*d* that press the edge portion of first face 81. That is, for example, first face presser 121*d* is in contact with the edge portion of first face 81 at three different points to press the three points.

Moreover, as illustrated in (b) in FIG. 9, for example, first face presser 121*d* includes four edge pressers 128*d* that press the edge portion of first face 81. That is, for example, first face presser 121*d* is in contact with the edge portion of first face 81 at four different points to press the four points.

Moreover, as illustrated in (c) in FIG. 9, for example, first face presser 121*d* presses the edge portion of first face 81 around the entire circumference. That is, for example, first face presser 121*d* is in contact with the entire edge portion of first face 81 to press the entire edge portion of first face 81.

Note that, for example, first face presser 121*d* may include one, two, or more than four edge pressers 128*d*.

As illustrated in FIG. 8, second face presser 127*d* presses optical element 80 from the side where second face 82 lies. In this embodiment, second face presser 127*d* presses second face 82. In this embodiment, second face presser 127*d* is in contact with second face 82. Note that, for example, second face presser 127*d* may not be in contact with second face 82 and may press second face 82 through other members. Second face presser 127*d* includes two second face pressing portions 129*d* that press second face 82. That is, in this embodiment, second face presser 127*d* is in contact with second face 82 at two different points to press the two points. Two second face pressing portions 129*d* are disposed on cover 23.

Note that, for example, second face presser 127*d* may include one or more than two second face pressing portions 129*d*. Moreover, for example, second face presser 127*d* may have flexibility as does first side portion presser 125 (see FIG. 2).

Note that, in this embodiment, first side portion 84 and second side portion 85 of optical element 80 may be orthogonal to first face 81 and second face 82 and may be parallel to each other. This also applies to Embodiments 6 to 12.

In this embodiment, fixing structure 120*d* fixes optical element 80 by holding optical element 80 with first face presser 121*d* and second face presser 127*d*.

Optical device 10*d* according to Embodiment 5 has been described above.

As described above, in optical device 10*d* according to Embodiment 5, optical element 80 includes side face 83 that links first face 81 and second face 82, and fixing structure 120*d* includes first face presser 121*d* provided for housing 20*d* and second face presser 127*d*. When optical element 80 is viewed from the side where first face 81 lies, first face presser 121*d* presses the edge portion of optical element 80 from the side where first face 81 lies, whereas second face presser 127*d* presses optical element 80 from the side where second face 82 lies.

With this, optical element 80 can be held and fixed between first face presser 121*d* and second face presser 127*d*. Moreover, the edge portion of optical element 80 can be covered by first face presser 121*d* when optical element 80 is viewed from the side where first face 81 lies. This prevents stray light, if any, coming from the edge portion from affecting the image displayed by optical device 10*d*, thereby preventing a reduction in the quality of the image displayed by optical device 10*d*.

Moreover, first face presser 121*d* includes three or more edge pressers 128*d* that press the edge portion of first face 81.

This prevents displacement of optical element 80, thereby further preventing a reduction in the quality of the image displayed by optical device 10*d*.

Moreover, first face presser 121*d* presses the edge portion of first face 81 around the entire circumference.

This prevents displacement of optical element 80, thereby further preventing a reduction in the quality of the image displayed by optical device 10*d*. Moreover, even if stray light is produced at the edge portion of first face 81, the stray light can be prevented from affecting the image displayed by optical device 10*d*. This prevents a reduction in the quality of the image displayed by optical device 10*d*.

Moreover, second face presser 127*d* has flexibility. This prevents damage to optical element 80, thereby further preventing a reduction in the quality of the image displayed by optical device 10*d*.

Moreover, housing 20*d* includes body 21*d* that accommodates optical element 80 and cover 23 that is attached to body 21*d* to cover second face 82 of optical element 80, and cover 23 is provided with second face presser 127*d*.

With this, optical element 80 can be held from different sides to be fixed as cover 23 is attached to body 21*d*. This easily prevents a reduction in the quality of the image displayed by optical device 10*d*.

Embodiment 6

Figure 10:
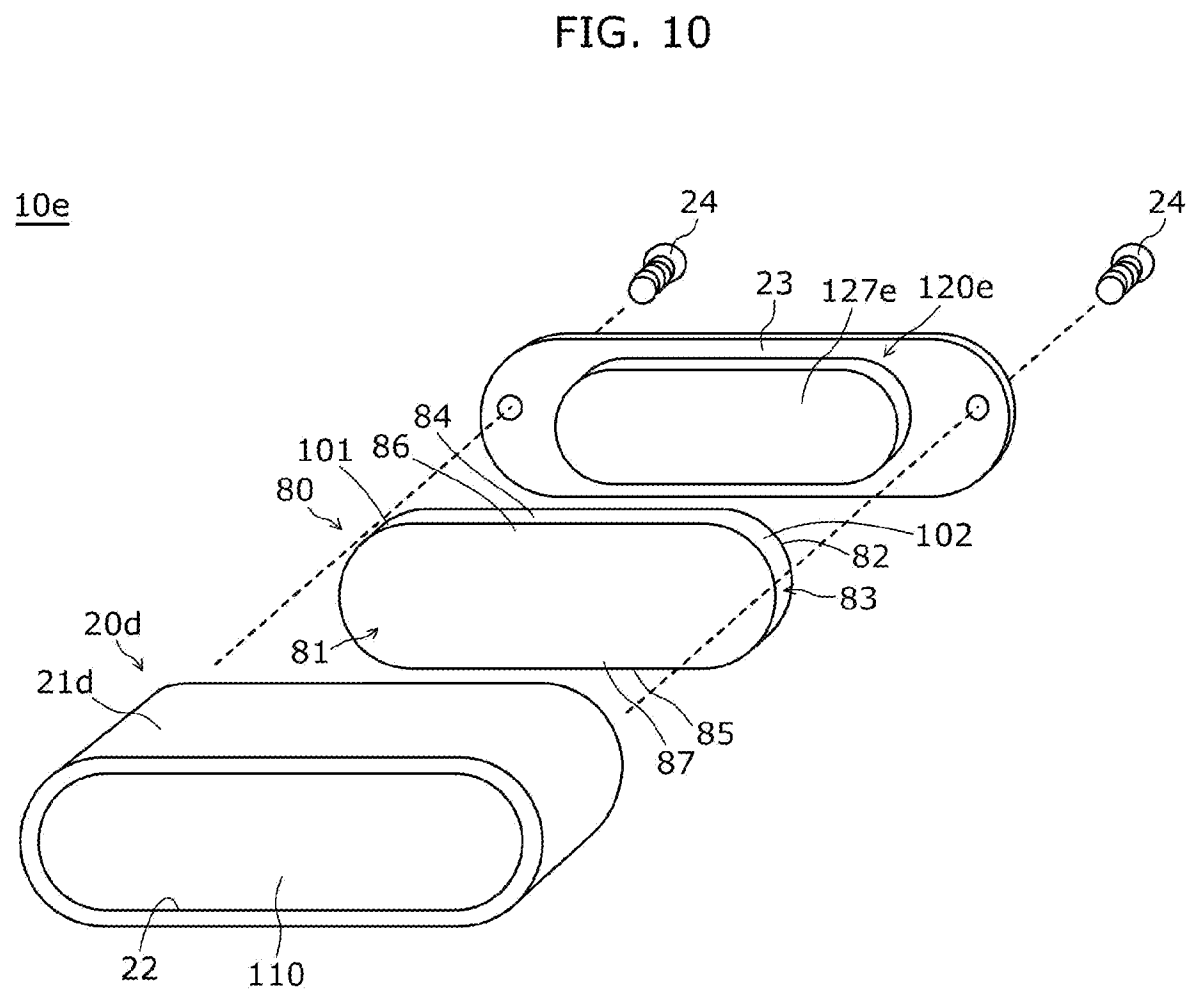

FIG. 10 is a schematic diagram of optical device 10*e* according to Embodiment 6. Specifically, FIG. 10 is an exploded perspective view of optical device 10*e*. Optical device 10*e* mainly differs from optical device 10*d* in including fixing structure 120*e* instead of fixing structure 120*d*.

As illustrated in FIG. 10, fixing structure 120*e* mainly differs from fixing structure 120*d* in including second face presser 127*e* instead of second face presser 127*d*.

Second face presser 127*e* is in surface contact with second face 82 to press second face 82. That is, second face presser 127*e* has a shape along second face 82 and presses second face 82 while in surface contact with second face 82. Note that, for example, second face presser 127*e* may not be in contact with second face 82 and may press second face 82 through other members. Moreover, for example, second face presser 127*e* may have flexibility as does first side portion presser 125 (see FIG. 2).

In this embodiment, fixing structure 120*e* fixes optical element 80 by holding optical element 80 with first face presser 121*d* and second face presser 127*e*.

Optical device 10*e* according to Embodiment 6 has been described above.

As described above, in optical device 10*e* according to Embodiment 6, fixing structure 120*e* includes second face presser 127*e*, and second face presser 127*e* is in surface contact with second face 82 to press second face 82.

This prevents a pressing force from being concentrated on a part of second face 82. Accordingly, optical element 80 can be held from different sides to be fixed while damage to second face 82 that reflects light is prevented. This further prevents a reduction in the quality of the image displayed by optical device 10*e*.

Embodiment 7

Figure 11:
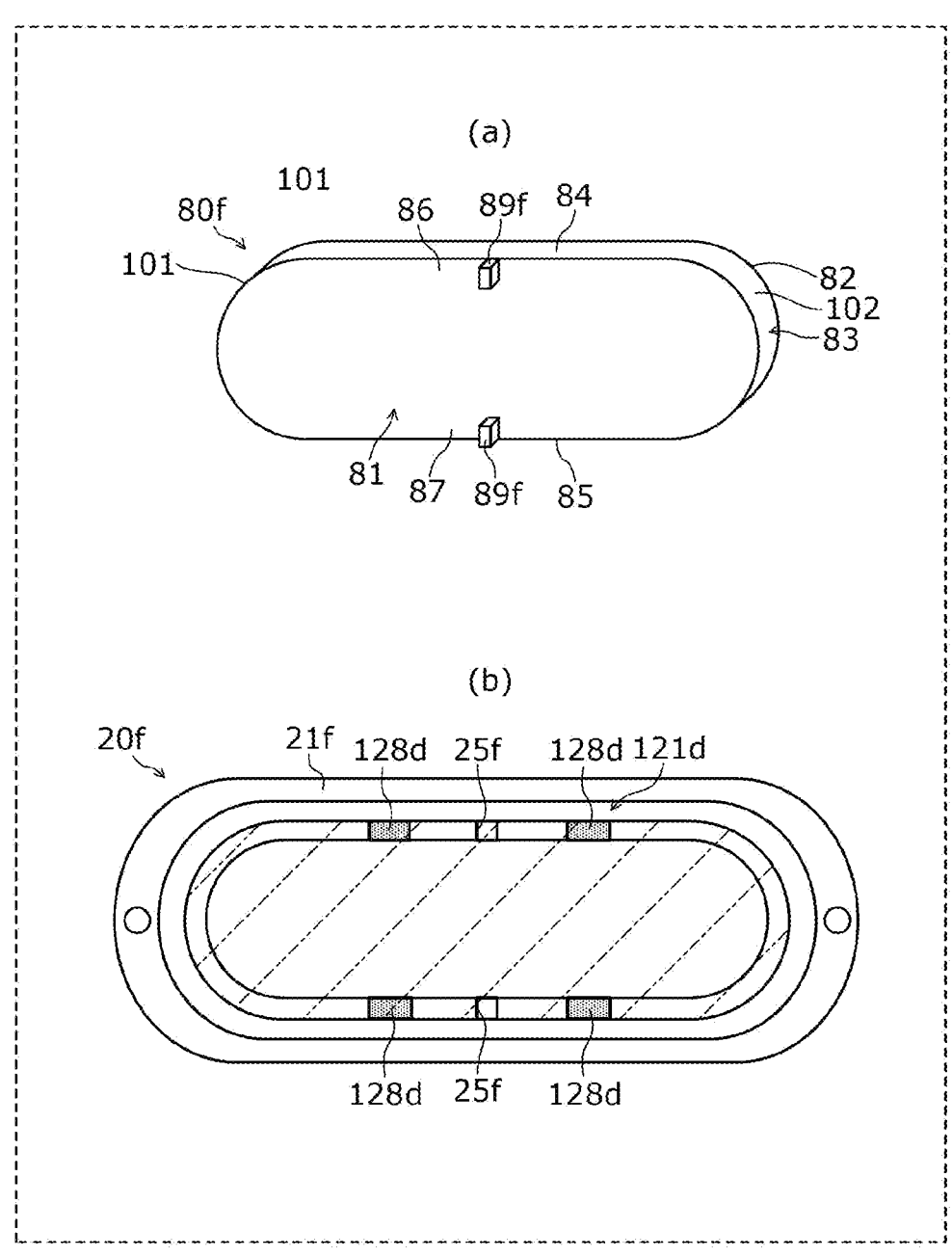
FIG. 11 is a schematic diagram of an optical element and the like according to Embodiment 7.

FIG. 11 is a schematic diagram of optical element 80*f* and the like according to Embodiment 7. (a) in FIG. 11 illustrates optical element 80*f*, and (b) in FIG. 11 illustrates the interior of body 21*f* of housing 20*f* viewed from the side where cover 23 lies. The part hatched with dash-dot-dot lines in (b) in FIG. 11 indicates a portion in which optical element 80*f* is accommodated. The optical device according to Embodiment 7 mainly differs from optical device 10*d* in including optical element 80*f* instead of optical element 80 and housing 20*f* instead of housing 20*d*.

As illustrated in (a) in FIG. 11, optical element 80*f* mainly differs from optical element 80 in further including two protrusions 89*f*. Two protrusions 89*f* are disposed at the edge portion of first face 81. Specifically, protrusions 89*f* are disposed at edge portion 86 and edge portion 87. In this embodiment, protrusions 89*f* correspond to a first protrusion.

Note that, for example, optical element 80*f* may include one or more than two protrusions 89*f*.

As illustrated in (b) FIG. 11, housing 20*f* mainly differs from housing 20*d* in including body 21*f* instead of body 21*d*. Body 21*f* mainly differs from body 21*d* illustrated in (b) in FIG. 9 in further including two recesses 25*f*. Two recesses 25*f* engage with respective protrusions 89*f*. In this embodiment, recesses 25*f* correspond to a second recess.

Note that, for example, housing 20*f* may include one or more than two recesses 25*f*.

The optical device according to Embodiment 7 has been described above.

As described above, in the optical device according to Embodiment 7, optical element 80*f* includes protrusions 89*f* disposed at the edge portion of first face 81, and housing 20*f* includes recesses 25*f* engaging with protrusions 89*f*.

With this, optical element 80*f* can be easily positioned relative to housing 20*f*. This easily prevents a reduction in the quality of the image displayed by the optical device.

Embodiment 8

Figure 12:
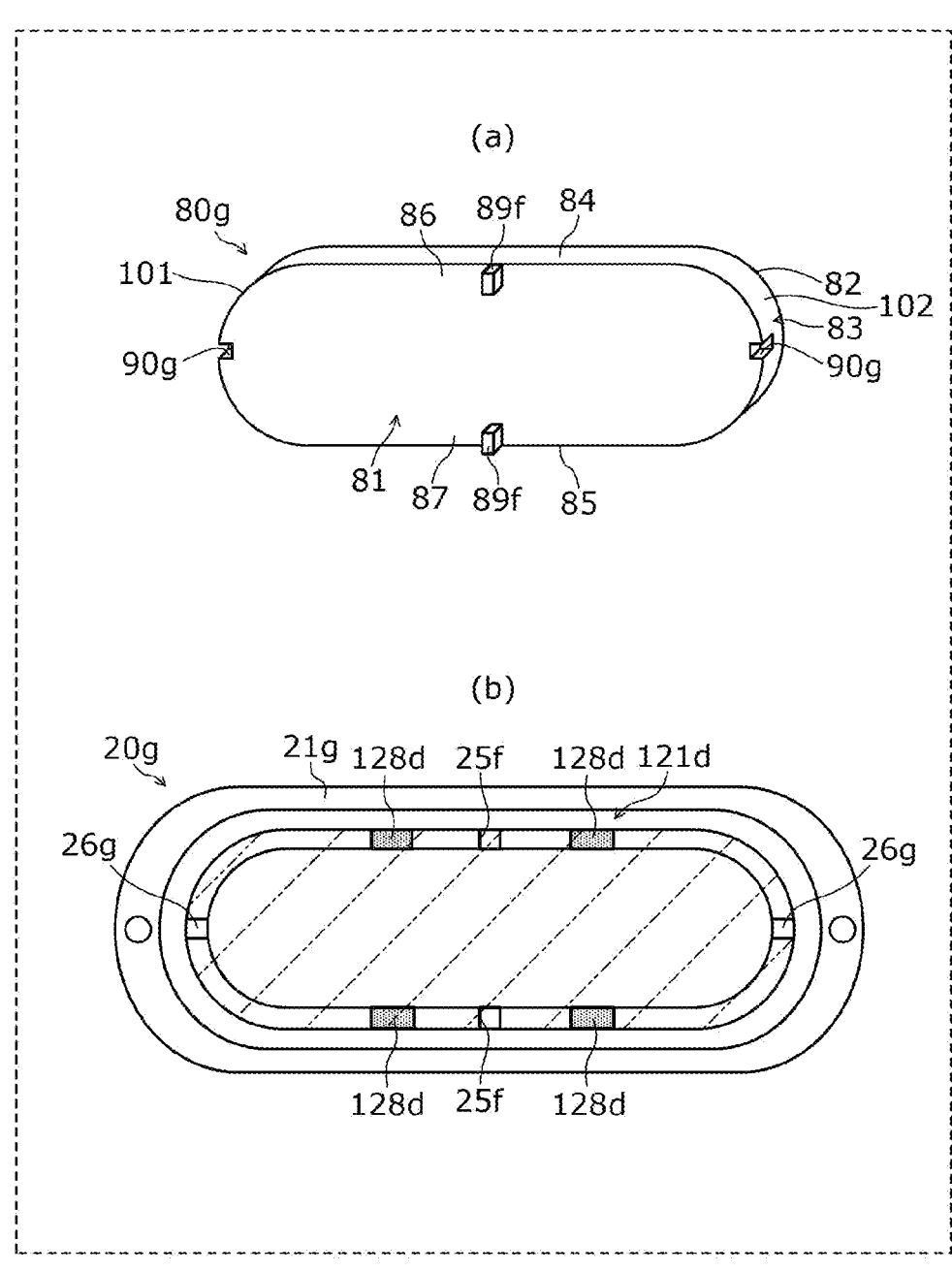
FIG. 12 is a schematic diagram of an optical element and the like according to Embodiment 8.

FIG. 12 is a schematic diagram of optical element 80*g* and the like according to Embodiment 8. (a) in FIG. 12 illustrates optical element 80*g*, and (b) in FIG. 12 illustrates the interior of body 21*g* of housing 20*g* viewed from the side where cover 23 lies. The part hatched with dash-dot-dot lines in (b) in FIG. 12 indicates a portion in which optical element 80*g* is accommodated. The optical device according to Embodiment 8 mainly differs from the optical device according to Embodiment 7 in including optical element 80*g* instead of optical element 80*f* and housing 20*g* instead of housing 20*f*.

As illustrated in (a) in FIG. 12, optical element 80*g* mainly differs from optical element 80*f* in further including two recesses 90*g*. Two recesses 90*g* are disposed at the edge portion of first face 81. In this embodiment, recesses 90*g* correspond to a first recess.

Note that, for example, optical element 80*g* may include one or more than two recesses 90*g*.

As illustrated in (b) in FIG. 12, housing 20*g* mainly differs from housing 20*f* in including body 21*g* instead of body 21*f*. Body 21*g* mainly differs from body 21*f* in further including two protrusions 26*g*. Two protrusions 26*g* engage with respective recesses 90*g*. In this embodiment, protrusions 26*g* correspond to a second protrusion.

Note that, for example, housing 20*g* may include one or more than two protrusions 26*g*.

The optical device according to Embodiment 8 has been described above.

As described above, in the optical device according to Embodiment 8, optical element 80*g* includes recesses 90*g* disposed at the edge portion of first face 81, and housing 20*g* includes protrusions 26*g* engaging with recesses 90*g*.

With this, optical element 80*g* can be easily positioned relative to housing 20*g*. This easily prevents a reduction in the quality of the image displayed by the optical device.

Embodiment 9

Figure 13:
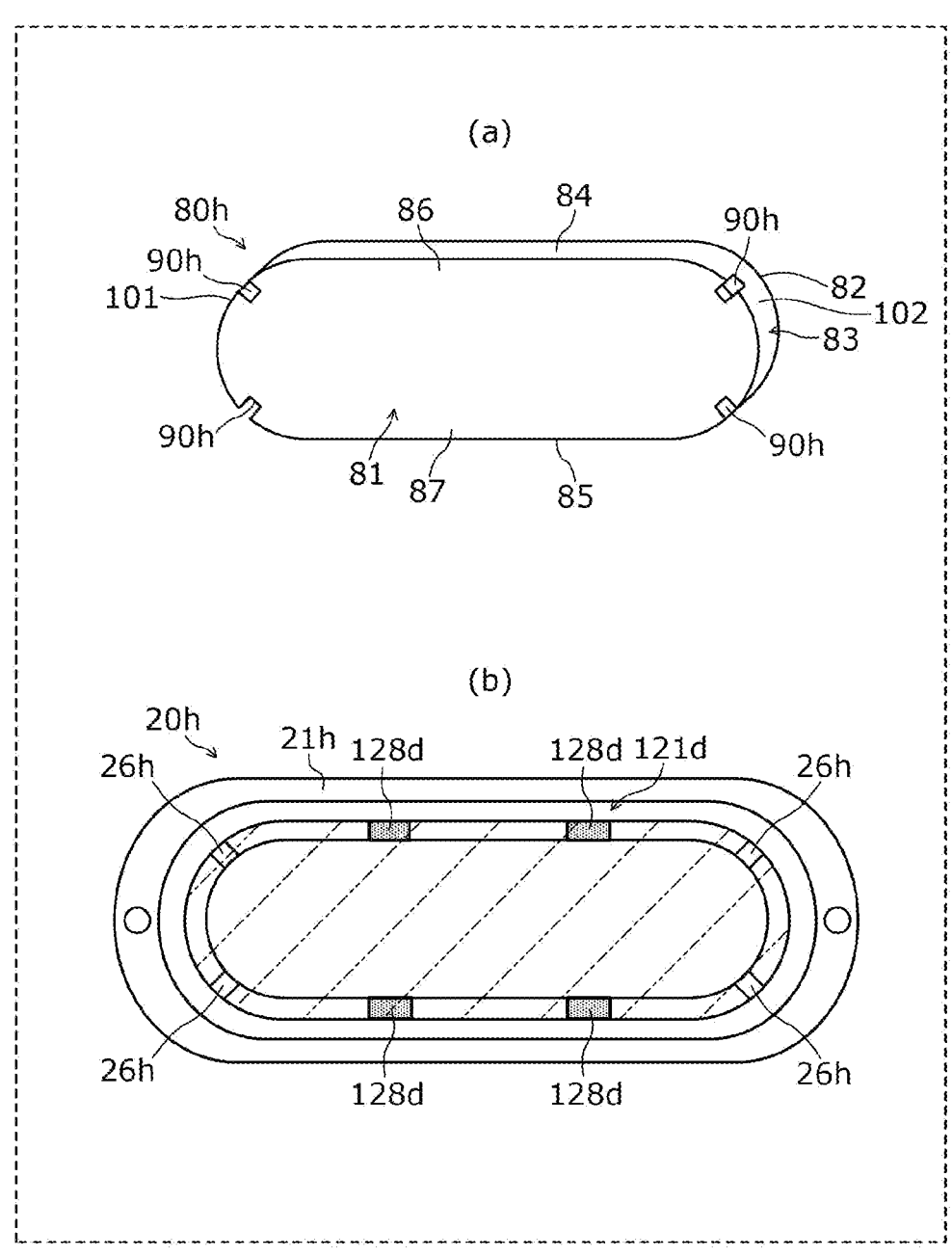
FIG. 13 is a schematic diagram of an optical element and the like according to Embodiment 9.

FIG. 13 is a schematic diagram of optical element 80*h* and the like according to Embodiment 9. (a) in FIG. 13 illustrates optical element 80*h*, and (b) in FIG. 13 illustrates the interior of body 21*h* of housing 20*h* viewed from the side where cover 23 lies. The part hatched with dash-dot-dot lines in (b) in FIG. 13 indicates a portion in which optical element 80*h* is accommodated. The optical device according to Embodiment 9 mainly differs from optical device 10*d* in including optical element 80*h* instead of optical element 80 and housing 20*h* instead of housing 20*d*.

As illustrated in (a) in FIG. 13, optical element 80*h* mainly differs from optical element 80 in further including four recesses 90*h*. Four recesses 90*h* are disposed at the edge portion of first face 81. In this embodiment, recesses 90*h* correspond to the first recess.

Note that, for example, optical element 80*h* may include one, two, three, or more than four recesses 90*h*.

As illustrated in (b) in FIG. 13, housing 20*h* mainly differs from housing 20*d* in including body 21*h* instead of body 21*d*. Body 21*h* mainly differs from body 21*d* illustrated in (b) in FIG. 9 in further including four protrusions 26*h*. Four protrusions 26*h* engage with respective recesses 90*h*. In this embodiment, protrusions 26*h* correspond to the second protrusion.

Note that, for example, housing 20*h* may include one, two, three, or more than four protrusions 26*h*.

The optical device according to Embodiment 9 has been described above.

As described above, in the optical device according to Embodiment 9, optical element 80*h* includes recesses 90*h* disposed at the edge portion of first face 81, and housing 20*h* includes protrusions 26*h* engaging with recesses 90*h*.

With this, optical element 80*h* can be easily positioned relative to housing 20*h*. This easily prevents a reduction in the quality of the image displayed by the optical device.

Embodiment 10

Figure 14:
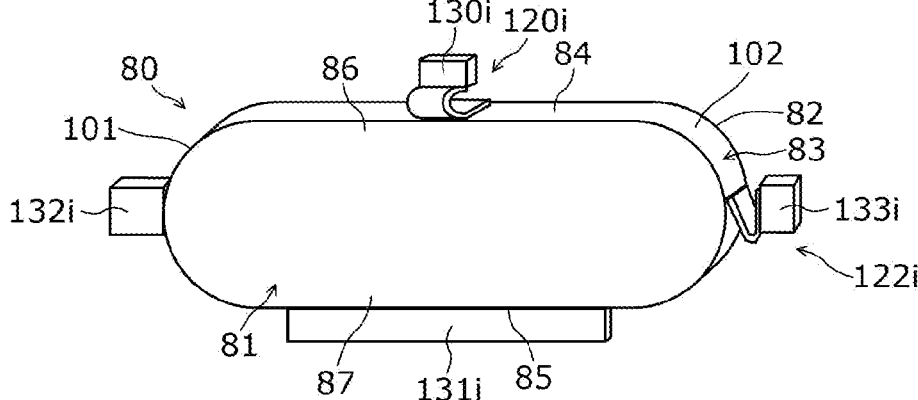
FIG. 14 is a schematic diagram of a fixing structure and the like according to Embodiment 10.

FIG. 14 is a schematic diagram of fixing structure 120*i* and the like according to Embodiment 10. The optical device according to Embodiment 10 mainly differs from optical device 10*d* in including fixing structure 120*i* instead of fixing structure 120*d*.

As illustrated in FIG. 14, fixing structure 120*i* mainly differs from fixing structure 120*d* in further including side face presser 122*i*. Side face presser 122*i* includes upper presser 130*i*, lower presser 131*i*, left presser 132*i*, and right presser 133*i*.

Upper presser 130*i* presses optical element 80 using an elastic force from above when optical element 80 is viewed from the side where first face 81 lies. Upper presser 130*i* is disposed between the inner surface of body 21*d* of housing 20*d* and side face 83 of optical element 80. For example, upper presser 130*i* includes a leaf spring.

Lower presser 131*i* presses optical element 80 from below when optical element 80 is viewed from the side where first face 81 lies. Lower presser 131*i* is disposed between the inner surface of body 21*d* of housing 20*d* and side face 83 of optical element 80.

Left presser 132*i* presses optical element 80 from the left when optical element 80 is viewed from the side where first face 81 lies. Left presser 132*i* is disposed between the inner surface of body 21*d* of housing 20*d* and side face 83 of optical element 80.

Right presser 133*i* presses optical element 80 using an elastic force from the right when optical element 80 is viewed from the side where first face 81 lies. Right presser 133*i* is disposed between the inner surface of body 21*d* of housing 20*d* and side face 83 of optical element 80. For example, right presser 133*i* includes a leaf spring.

Note that left presser 132*i* and right presser 133*i* may be interchanged. That is, a left presser may be provided to press optical element 80 using an elastic force from the left.

In this embodiment, fixing structure 120*i* fixes optical element 80 by holding optical element 80 with first face presser 121*d* illustrated in FIG. 9, second face presser 127*d* illustrated in FIG. 8 or second face presser 127*e* illustrated in FIG. 10, and side face presser 122*i* illustrated in FIG. 14. With this configuration, optical element 80 is pressed and fixed by the elastic forces in all directions including the up-down and left-right directions when viewed from the side where first face 81 lies in FIG. 14 and the depth direction (front-back direction) in FIG. 14. Accordingly, the effect of the thermal expansion and vibration of optical element 80 in all directions on the image can be eliminated or minimized.

The optical device according to Embodiment 10 has been described above.

As described above, in the optical device according to Embodiment 10, fixing structure 120*i* includes side face presser 122*i*, and side face presser 122*i* includes upper presser 130*i* that presses optical element 80 using the elastic force from above and right presser 133*i* that presses optical element 80 using the elastic force from the right when optical element 80 is viewed from the side where first face 81 lies.

This prevents damage to optical element 80 even if, for example, optical element 80 expands, thereby further preventing a reduction in the quality of the image displayed by the optical device.

Embodiment 11

Figure 15:
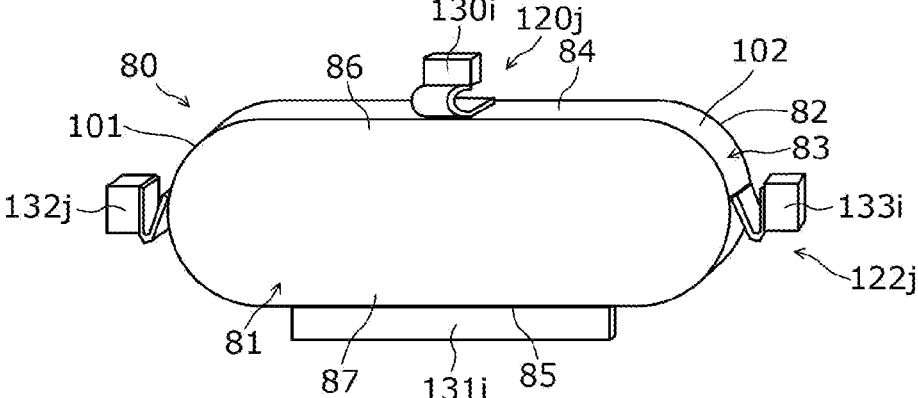
FIG. 15 is a schematic diagram of a fixing structure and the like according to Embodiment 11.

FIG. 15 is a schematic diagram of fixing structure 120*j* and the like according to Embodiment 11. The optical device according to Embodiment 11 mainly differs from the optical device according to Embodiment 10 in including fixing structure 120*j* instead of fixing structure 120*i*.

As illustrated in FIG. 15, fixing structure 120*j* mainly differs from fixing structure 120*i* in including side face presser 122*j* instead of side face presser 122*i*. Side face presser 122*j* mainly differs from side face presser 122*i* in including left presser 132*j* instead of left presser 132*i*.

Left presser 132*j* presses optical element 80 using an elastic force from the left when optical element 80 is viewed from the side where first face 81 lies. Left presser 132*j* is disposed between the inner surface of body 21*d* of housing 20*d* and side face 83 of optical element 80. For example, left presser 132*j* includes a leaf spring.

In this embodiment, fixing structure 120*j* fixes optical element 80 by holding optical element 80 with first face presser 121*d* illustrated in FIG. 9, second face presser 127*d* illustrated in FIG. 8 or second face presser 127*e* illustrated in FIG. 10, and side face presser 122*j* illustrated in FIG. 15. With this configuration, optical element 80 is pressed and fixed by the elastic forces in all directions including the up-down and left-right directions when viewed from the side where first face 81 lies in FIG. 15 and the depth direction (front-back direction) in FIG. 15. Accordingly, the effect of the thermal expansion and vibration of optical element 80 in all directions on the image can be eliminated or minimized.

The optical device according to Embodiment 11 has been described above.

As described above, in the optical device according to Embodiment 11, fixing structure 120*j* includes side face presser 122*j*, and side face presser 122*j* includes upper presser 130*i* that presses optical element 80 using the elastic force from above, left presser 132*j* that presses optical element 80 using the elastic force from the left, and right presser 133*i* that presses optical element 80 using the elastic force from the right when optical element 80 is viewed from the side where first face 81 lies.

This prevents damage to optical element 80 even if, for example, optical element 80 expands, thereby further preventing a reduction in the quality of the image displayed by the optical device.

Embodiment 12

Figure 16:
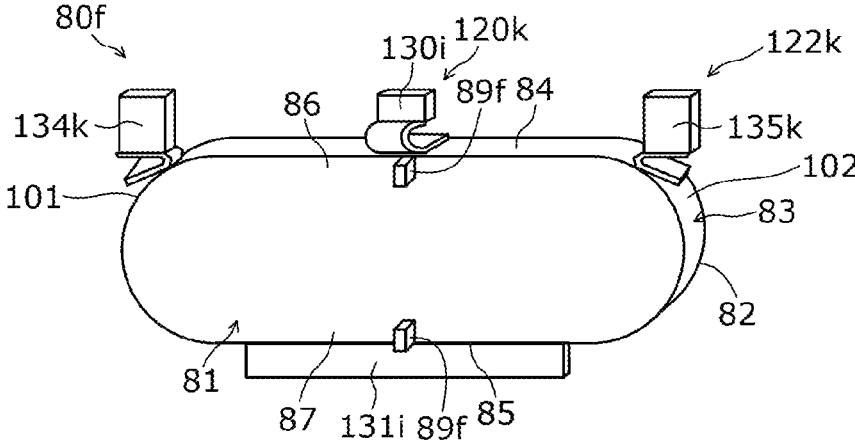
FIG. 16 is a schematic diagram of a fixing structure and the like according to Embodiment 12.

FIG. 16 is a schematic diagram of fixing structure 120*k* and the like according to Embodiment 12. The optical device according to Embodiment 12 mainly differs from the optical device according to Embodiment 7 in including fixing structure 120*k* instead of fixing structure 120*d*.

Fixing structure 120*k* mainly differs from fixing structure 120*d* in further including side face presser 122*k*. Side face presser 122*k* includes upper presser 130*i*, lower presser 131*i*, upper left presser 134*k*, and upper right presser 135*k*.

Upper presser 130*i* and lower presser 131*i* have already been explained in Embodiment 10, and thus detailed descriptions thereof will be omitted.

Upper left presser 134*k* presses optical element 80*f* using an elastic force from the upper left when optical element 80*f* is viewed from the side where first face 81 lies. Upper left presser 134*k* is disposed between the inner surface of body 21*d* of housing 20*d* and side face 83 of optical element 80*f*. For example, upper left presser 134*k* includes a leaf spring.

Upper right presser 135*k* presses optical element 80*f* using an elastic force from the upper right when optical element 80*f* is viewed from the side where first face 81 lies. Upper right presser 135*k* is disposed between the inner surface of body 21*d* of housing 20*d* and side face 83 of optical element 80*f*. For example, upper right presser 135*k* includes a leaf spring.

In this embodiment, fixing structure 120*k* fixes optical element 80*f* by holding optical element 80*f* with first face presser 121*d* illustrated in FIG. 9, second face presser 127*d* illustrated in FIG. 8 or second face presser 127*e* illustrated in FIG. 10, and side face presser 122*k* illustrated in FIG. 16. With this configuration, optical element 80*f* is pressed and fixed by the elastic forces in all directions including the up-down and left-right directions when viewed from the side where first face 81 lies in FIG. 16 and the depth direction (front-back direction) in FIG. 16. Accordingly, the effect of the thermal expansion and vibration of optical element 80*f* in all directions on the image can be eliminated or minimized.

The optical device according to Embodiment 12 has been described above.

Embodiment 13

Figure 17:
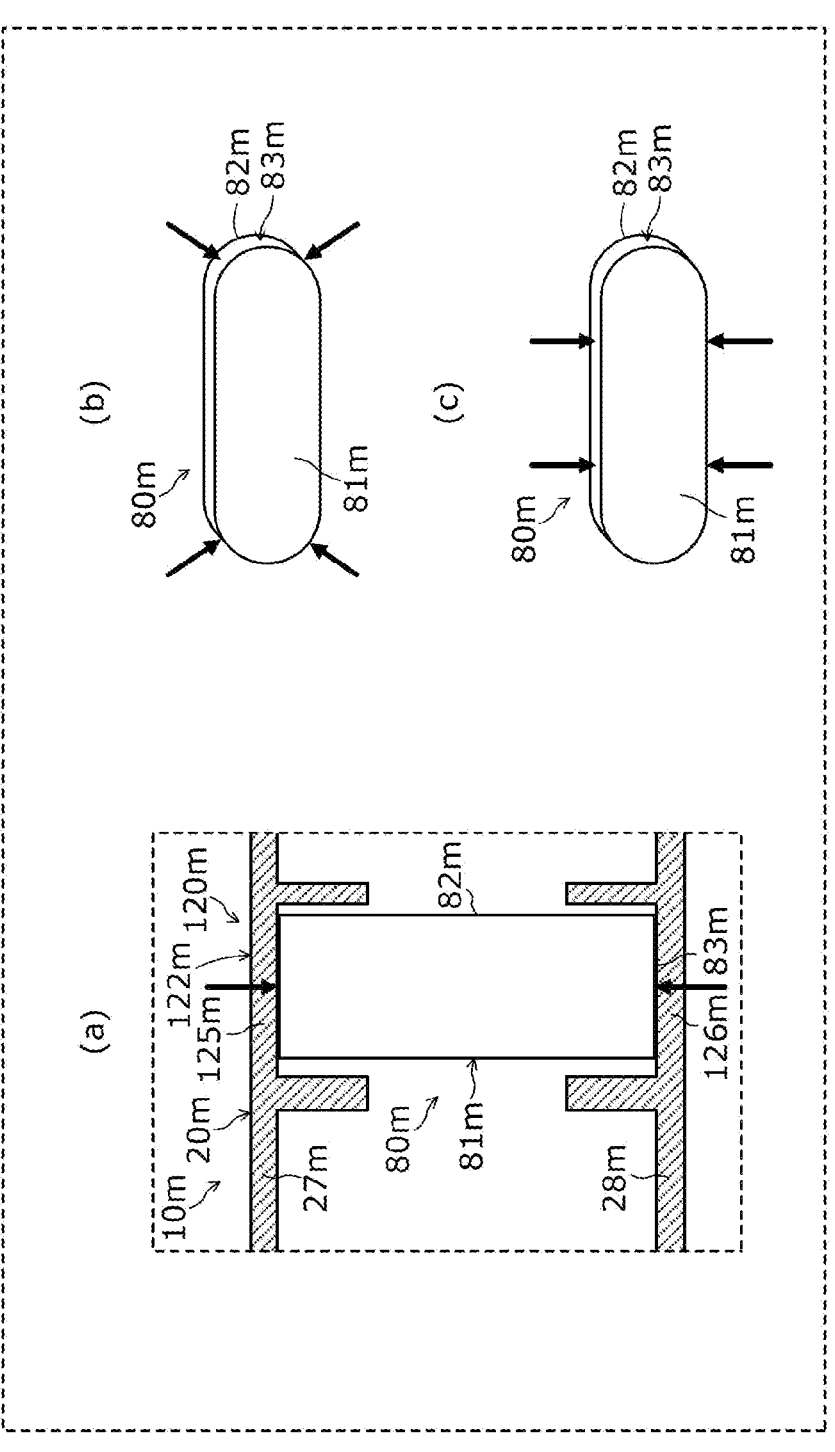
FIG. 17 is a schematic diagram of an optical device according to Embodiment 13.

FIG. 17 is a schematic diagram of optical device 10*m* according to Embodiment 13. (a) in FIG. 17 illustrates optical element 80*m*, housing 20*m*, and fixing structure 120*m* in optical device 10*m*. (b) and (c) in FIG. 17 illustrate optical element 80*m* in optical device 10*m*. Note that housing 20*m* is illustrated in cross section in (a) in FIG. 17.

As illustrated in FIG. 17, optical device 10*m* includes housing 20*m*, optical element 80*m*, and fixing structure 120*m*. Note that, although not illustrated, optical device 10*m* includes a display that emits light representing an image to optical element 80*m*, a light-transmitting cover that allows the light emitted from optical element 80*m* to pass therethrough, and the like.

Housing 20*m* accommodates optical element 80*m* and the like. Housing 20*m* includes first member 27*m* and second member 28*m*. Note that, although not illustrated, housing 20*m* includes an emission portion that guides the light emitted from optical element 80*m* to the outside of housing 20*m*.

First member 27*m* and second member 28*m* are separable and detachable from each other in the up-down direction when optical element 80*m* is viewed from a side where first face 81*m* lies.

Optical element 80*m* includes first face 81*m*, second face 82*m* that faces first face 81*m*, and side face 83*m* that links first face 81*m* and second face 82*m*. Optical element 80*m* is provided such that light is emitted from the display, enters optical element 80*m* through first face 81*m*, and then is reflected from second face 82*m* to be guided to the outside of optical element 80*m* through first face 81*m*.

Fixing structure 120*m* fixes optical element 80*m* by holding optical element 80*m* from different sides. Fixing structure 120*m* includes side face presser 122*m*.

Side face presser 122*m* includes first side portion presser 125*m* and second side portion presser 126*m*.

First side portion presser 125*m* constitutes a part of first member 27*m* and presses optical element 80*m* from above when optical element 80*m* is viewed from the side where first face 81*m* lies.

Second side portion presser 126*m* constitutes a part of second member 28*m* and presses optical element 80*m* from below when optical element 80*m* is viewed from the side where first face 81*m* lies.

Note that, for example, when viewed from the side where first face 81*m* lies, optical element 80*m* may be pressed in directions inclined with respect to the up-down direction as illustrated in (b) in FIG. 17 or in the up-down direction as illustrated in (c) in FIG. 17.

In this embodiment, fixing structure 120*m* fixes optical element 80*m* by holding optical element 80*m* from different sides with side face presser 122*m*.

Optical device 10*m* according to Embodiment 13 has been described above.

Embodiment 14

Figure 18:
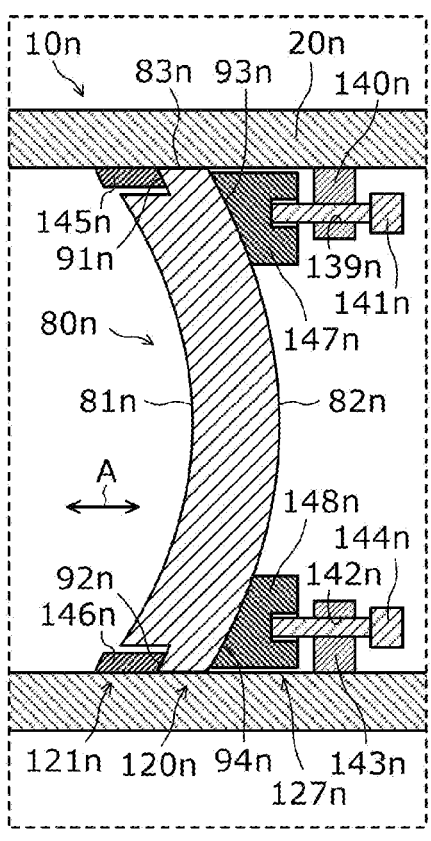
FIG. 18 is a schematic diagram of an optical device according to Embodiment 14.

FIG. 18 is a schematic diagram of optical device 10*n* according to Embodiment 14. Specifically, FIG. 18 is a cross-sectional view of optical device 10*n*. In FIG. 18, optical device 10*n* is viewed from above.

As illustrated in FIG. 18, optical device 10*n* includes housing 20*n*, optical element 80*n*, and fixing structure 120*n*. Note that, although not illustrated, optical device 10*n* includes a display that emits light representing an image to optical element 80*n* and a light-transmitting cover that allows the light emitted from optical element 80*n* to pass therethrough.

Housing 20*n* accommodates optical element 80*n* and the like. Note that, although not illustrated, housing 20*n* includes an emission portion that guides the light emitted from optical element 80*n* to the outside of housing 20*n*.

Optical element 80*n* includes first face 81*n*, second face 82*n* that faces first face 81*n*, and side face 83*n* that links first face 81*n* and second face 82*n*. Optical element 80*n* is provided such that light is emitted from the display, enters optical element 80*n* through first face 81*n*, and then is reflected from second face 82*n* to be guided to the outside of optical element 80*n* through first face 81*n*.

First face 81*n* is curved toward second face 82*n*, and second face 82*n* is curved away from first face 81*n*.

Fixing structure 120*n* fixes optical element 80*n* by holding optical element 80*n* from different sides. Fixing structure 120*n* includes first face presser 121*n*, second face presser 127*n*, member 140*n* with screw hole 139*n*, screw 141*n* that presses second face presser 127*n* toward optical element 80*n* while fitted in screw hole 139*n*, member 143*n* with screw hole 142*n*, and screw 144*n* that presses second face presser 127*n* toward optical element 80*n* while fitted in screw hole 142*n*.

First face presser 121*n* is provided for housing 20*n* and presses the edge portion of optical element 80*n* from a side where first face 81*n* lies when optical element 80*n* is viewed from the side where first face 81*n* lies. In this embodiment, first face presser 121*n* includes one edge presser 145*n* and other edge presser 146*n*.

One edge presser 145*n* presses one edge portion 91*n* of optical element 80*n* from the side where first face 81*n* lies when optical element 80*n* is viewed from the side where first face 81*n* lies. In this embodiment, one edge presser 145*n* is in contact with edge portion 91*n*. In this embodiment, edge portion 91*n* is the left edge portion of optical element 80*n* when optical element 80*n* is viewed from the side where first face 81*n* lies. In this embodiment, one edge presser 145*n* is provided for housing 20*n* and protrudes to the right from the inner surface of housing 20*n* when optical element 80*n* is viewed from the side where first face 81*n* lies.

Other edge presser 146*n* presses other edge portion 92*n* of optical element 80*n* from the side where first face 81*n* lies when optical element 80*n* is viewed from the side where first face 81*n* lies. In this embodiment, other edge presser 146*n* is in contact with edge portion 92*n*. In this embodiment, edge portion 92*n* is the right edge portion of optical element 80*n* when optical element 80*n* is viewed from the side where first face 81*n* lies. In this embodiment, other edge presser 146*n* is provided for housing 20*n* and protrudes to the left from the inner surface of housing 20*n* when optical element 80*n* is viewed from the side where first face 81*n* lies.

Second face presser 127*n* includes one edge presser 147*n* and other edge presser 148*n*.

One edge presser 147*n* presses one edge portion 93*n* of second face 82*n* from a side where second face 82*n* lies when optical element 80*n* is viewed from the side where first face 81*n* lies. In this embodiment, one edge presser 147*n* is in contact with edge portion 93*n*. In this embodiment, edge portion 93*n* is the left edge portion of second face 82*n* when optical element 80*n* is viewed from the side where first face 81*n* lies. In this embodiment, one edge presser 147*n* is separate from housing 20*n* and presses optical element 80*n* by being pressed toward optical element 80*n* by screw 141*n*. Moreover, in this embodiment, one edge presser 145*n* and one edge presser 147*n* mutually hold optical element 80*n* in directions A in which first face 81*n* and second face 82*n* face each other. That is, when viewed in direction A, one edge presser 145*n* and one edge presser 147*n* overlap each other.

Other edge presser 148*n* presses other edge portion 94*n* of second face 82*n* from the side where second face 82*n* lies when optical element 80*n* is viewed from the side where first face 81*n* lies. In this embodiment, other edge presser 148*n* is in contact with edge portion 94*n*. In this embodiment, edge portion 94*n* is the right edge portion of second face 82*n* when optical element 80*n* is viewed from the side where first face 81*n* lies. In this embodiment, other edge presser 148*n* is separate from housing 20*n* and presses optical element 80*n* by being pressed toward optical element 80*n* by screw 144*n*. Moreover, in this embodiment, other edge presser 146*n* and other edge presser 148*n* mutually hold optical element 80*n* in directions A in which first face 81*n* and second face 82*n* face each other. That is, when viewed in direction A, other edge presser 146*n* and other edge presser 148*n* overlap each other.

In this embodiment, fixing structure 120*n* holds and fixes optical element 80*n* between first face presser 121*n* and second face presser 127*n* as screw 141*n* and screw 144*n* are tightened.

Optical device 10*n* according to Embodiment 14 has been described above.

As described above, in optical device 10*n* according to Embodiment 14, fixing structure 120*n* includes second face presser 127*n*, and first face presser 121*n* and second face presser 127*n* mutually hold optical element 80*n* in directions A in which first face 81*n* and second face 82*n* face each other.

This prevents deformation of optical element 80*n* caused when optical element 80*n* is held from different sides, thereby further preventing a reduction in the quality of the image displayed by optical device 10*n*.

Moreover, fixing structure 120*n* includes second face presser 127*n*, member 140*n* with screw hole 139*n*, and screw 141*n* that presses second face presser 127*n* (one edge presser 147*n*) toward optical element 80*n* while fitted in screw hole 139*n*; and second face presser 127*n* (one edge presser 147*n*) presses optical element 80*n* by being pressed toward optical element 80*n* by screw 141*n*.

This prevents displacement of optical element 80*n*, thereby further preventing a reduction in the quality of the image displayed by optical device 10*n*.

Note that this embodiment may be combined with any of fixing structures 120*i* and 120*j* of optical element 80 illustrated in FIGS. 14 and 15, respectively, and fixing structure 120*k* of optical element 80*f* illustrated in FIG. 16. In this case, optical element 80*n* is pressed and fixed in all directions including the up-down and left-right directions when viewed from the side where first face 81*n* lies in FIG. 18 and the depth direction (front-back direction, i.e., direction A in FIG. 18). At this moment, for example, one edge presser 147*n* and other edge presser 148*n* composed of elastic members and fixing structure 120*i*, 120*j*, or 120*k* having elasticity can eliminate or minimize the effect of the thermal expansion and vibration of optical element 80*n* in all directions on the image.

Embodiment 15

Figure 19:
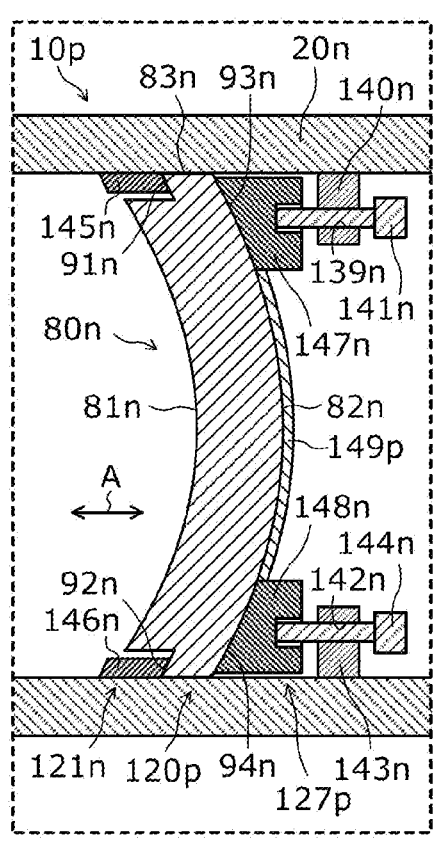
FIG. 19 is a schematic diagram of an optical device according to Embodiment 15.

FIG. 19 is a schematic diagram of optical device 10*p* according to Embodiment 15. Specifically, FIG. 19 is a cross-sectional view of optical device 10p. In FIG. 19, optical device 10p is viewed from above. Optical device 10p mainly differs from optical device 10n in including fixing structure 120p instead of fixing structure 120n.

As illustrated in FIG. 19, fixing structure 120p mainly differs from fixing structure 120n in including second face presser 127p instead of second face presser 127n.

Second face presser 127p mainly differs from second face presser 127n in further including covering presser 149p.

Covering presser 149p presses second face 82n while covering second face 82n between one edge presser 147n and other edge presser 148n. Covering presser 149p presses second face 82n while in surface contact with second face 82n. For example, covering presser 149p is bonded to one edge presser 147n and other edge presser 148n with adhesive or the like to be attached to one edge presser 147n and other edge presser 148n. Note that, for example, covering presser 149p may be integral to one edge presser 147n and other edge presser 148n.

In this embodiment, fixing structure 120p holds and fixes optical element 80n between first face presser 121n and second face presser 127p as screw 141n and screw 144n are tightened.

Optical device 10p according to Embodiment 15 has been described above.

As described above, in optical device 10p according to Embodiment 15, fixing structure 120p includes second face presser 127p, and second face presser 127p includes one edge presser 147n that presses one edge portion 93n of second face 82n, other edge presser 148n that presses other edge portion 94n of second face 82n, and covering presser 149p that presses second face 82n while covering second face 82n between one edge presser 147n and other edge presser 148n.

This prevents displacement of optical element 80n, thereby further preventing a reduction in the quality of the image displayed by optical device 10p.

Note that this embodiment may be combined with any of fixing structures 120i and 120j of optical element 80 illustrated in FIGS. 14 and 15, respectively, and fixing structure 120k of optical element 80f illustrated in FIG. 16. In this case, optical element 80n is pressed and fixed in all directions including the up-down and left-right directions when viewed from the side where first face 81n lies in FIG. 19 and the depth direction (front-back direction, i.e., direction A in FIG. 19). At this moment, for example, one edge presser 147n, other edge presser 148n, and covering presser 149p composed of elastic members and fixing structure 120i, 120j, or 120k having elasticity can eliminate or minimize the effect of the thermal expansion and vibration of optical element 80n in all directions on the image.

Embodiment 16

Figure 20:
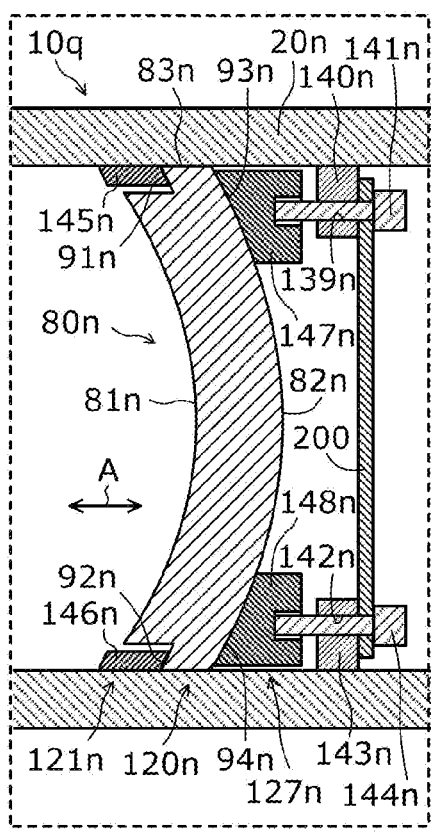
FIG. 20 is a schematic diagram of an optical device according to Embodiment 16.

FIG. 20 is a schematic diagram of optical device 10q according to Embodiment 16. Specifically, FIG. 20 is a cross-sectional view of optical device 10q. In FIG. 20, optical device 10q is viewed from above. Optical device 10q mainly differs from optical device 10n in further including substrate 200.

For example, substrate 200 is used to control optical device 10q. Substrate 200 is held from different sides to be fixed between screw 141n and member 140n and between screw 144n and member 143n while screws 141n and 144n are respectively fitted in screw holes 139n and 142n.

Optical device 10q according to Embodiment 16 has been described above.

As described above, optical device 10q according to Embodiment 16 further includes substrate 200 held and fixed between screw 141n and member 140n while screw 141n is fitted in screw hole 139n.

This allows substrate 200 to be provided without an increase in the number of parts.

Note that this embodiment may be combined with any of fixing structures 120i and 120j of optical element 80 illustrated in FIGS. 14 and 15, respectively, and fixing structure 120k of optical element 80f illustrated in FIG. 16. In this case, optical element 80n is pressed and fixed in all directions including the up-down and left-right directions when viewed from the side where first face 81n lies in FIG. and the depth direction (front-back direction, i.e., direction A in FIG. 20). At this moment, for example, one edge presser 147n and other edge presser 148n composed of elastic members and fixing structure 120i, 120j, or 120k having elasticity can eliminate or minimize the effect of the thermal expansion and vibration of optical element 80n in all directions on the image.

Embodiment 17

Figure 21:
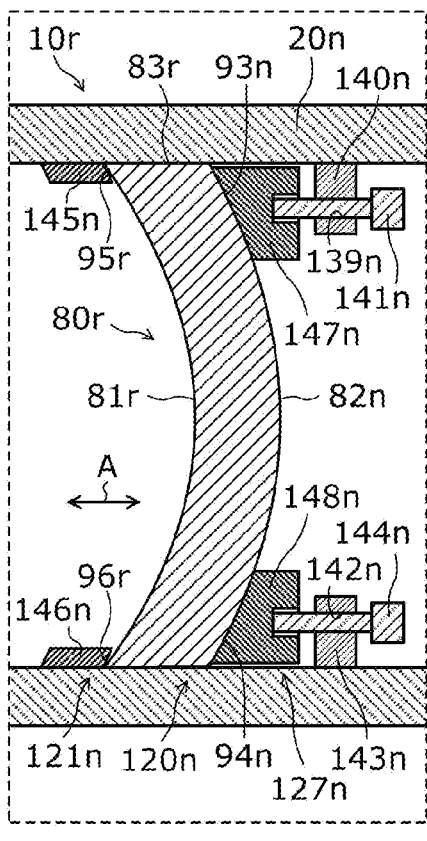
FIG. 21 is a schematic diagram of an optical device according to Embodiment 17.

FIG. 21 is a schematic diagram of optical device 10r according to Embodiment 17. Specifically, FIG. 21 is a cross-sectional view of optical device 10r. In FIG. 21, optical device 10r is viewed from above. Optical device 10r mainly differs from optical device 10n in including optical element 80r instead of optical element 80n.

Optical element 80r mainly differs from optical element 80n in including first face 81r instead of first face 81n and side face 83r instead of side face 83n.

One edge presser 145n presses one edge portion 95r of first face 81r, whereas other edge presser 146n presses other edge portion 96r of first face 81r.

In this embodiment, fixing structure 120n holds and fixes optical element 80r between first face presser 121n and second face presser 127n as screw 141n and screw 144n are tightened.

Optical device 10r according to Embodiment 17 has been described above.

Note that this embodiment may be combined with any of fixing structures 120i and 120j of optical element 80 illustrated in FIGS. 14 and 15, respectively, and fixing structure 120k of optical element 80f illustrated in FIG. 16. In this case, optical element 80r is pressed and fixed in all directions including the up-down and left-right directions when viewed from a side where first face 81r lies in FIG. 21 and the depth direction (front-back direction, i.e., direction A in FIG. 21). At this moment, for example, one edge presser 147n and other edge presser 148n composed of elastic members and fixing structure 120i, 120j, or 120k having elasticity can eliminate or minimize the effect of the thermal expansion and vibration of optical element 80r in all directions on the image.

Embodiment 18

Figure 22:
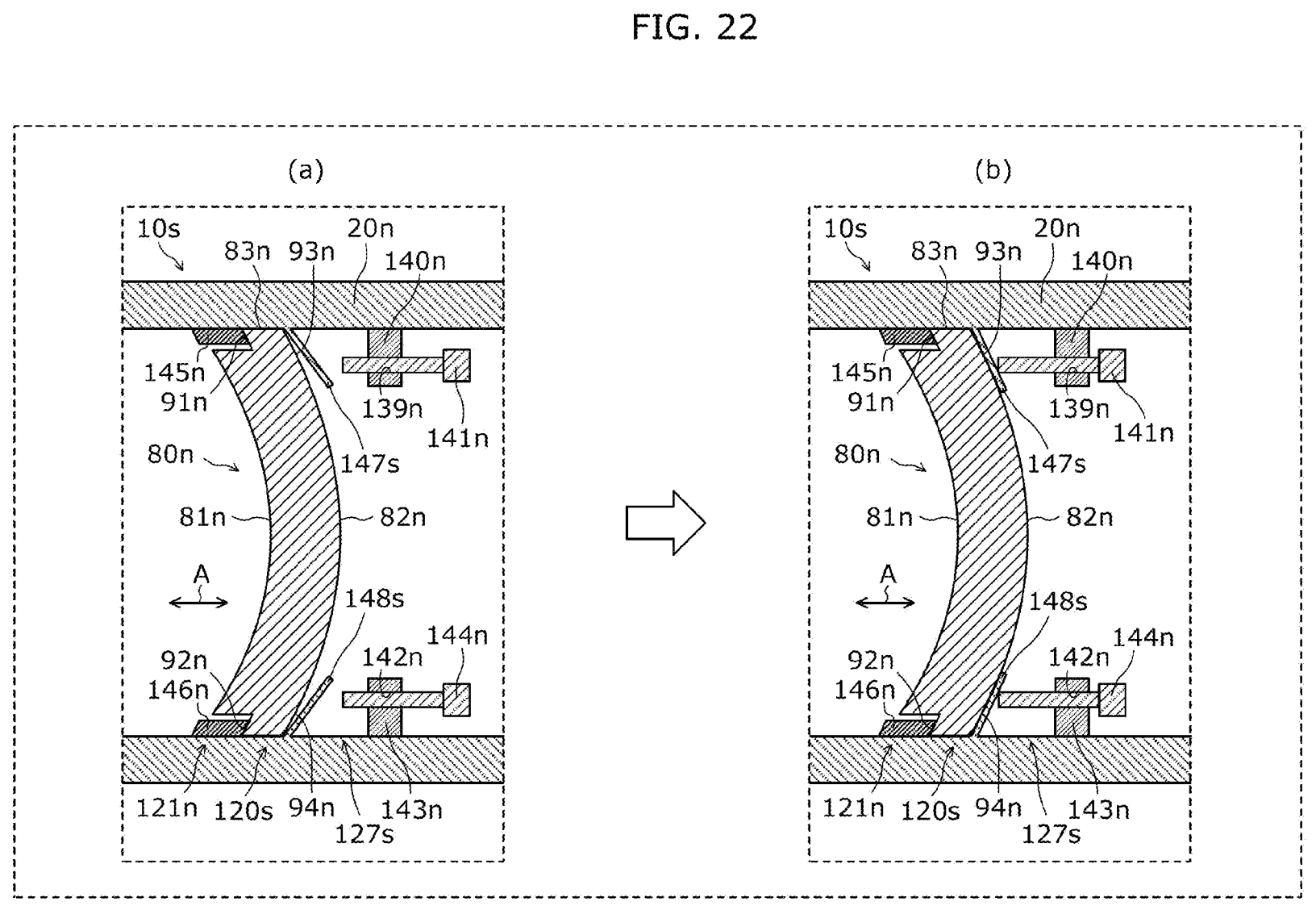

FIG. 22 is a schematic diagram of optical device 10s according to Embodiment 18. Specifically, FIG. 22 is a cross-sectional view of optical device 10s. In FIG. 22, optical device 10s is viewed from above. Optical device 10s mainly differs from optical device 10n in including fixing structure 120s instead of fixing structure 120n.

Fixing structure 120s mainly differs from fixing structure 120n in including second face presser 127s instead of second face presser 127n.

Second face presser 127s includes one edge presser 147s and other edge presser 148s.

One edge presser 147s mainly differs from one edge presser 147n in being integral to housing 20n. One edge presser 147s has a thin, flat shape and has flexibility sufficient to pivot on housing 20n.

Other edge presser 148s mainly differs from other edge presser 148n in being integral to housing 20n. Other edge presser 148s has a thin, flat shape and has flexibility sufficient to pivot on housing 20n.

In this embodiment, screws 141n and 144n are tightened from a state illustrated in (a) in FIG. 22 so that one edge presser 147s and other edge presser 148s are pressed toward optical element 80n as illustrated in (b) in FIG. 22. Thus, fixing structure 120s fixes optical element 80n by holding optical element 80n with first face presser 121n and second face presser 127s.

Optical device 10s according to Embodiment 18 has been described above.

As described above, in optical device 10s according to Embodiment 18, second face presser 127s is integral to housing 20n.

This prevents a reduction in the quality of the image displayed by optical device 10s while preventing an increase in the number of parts.

Note that this embodiment may be combined with any of fixing structures 120i and 120j of optical element 80 illustrated in FIGS. 14 and 15, respectively, and fixing structure 120k of optical element 80f illustrated in FIG. 16. In this case, optical element 80n is pressed and fixed in all directions including the up-down and left-right directions when viewed from the side where first face 81n lies in FIG. 22 and the depth direction (front-back direction, i.e., direction A in FIG. 22). At this moment, for example, one edge presser 147s and other edge presser 148s having flexibility and fixing structure 120i, 120j, or 120k having elasticity can eliminate or minimize the effect of the thermal expansion and vibration of optical element 80n in all directions on the image.

Embodiment 19

Figure 23:
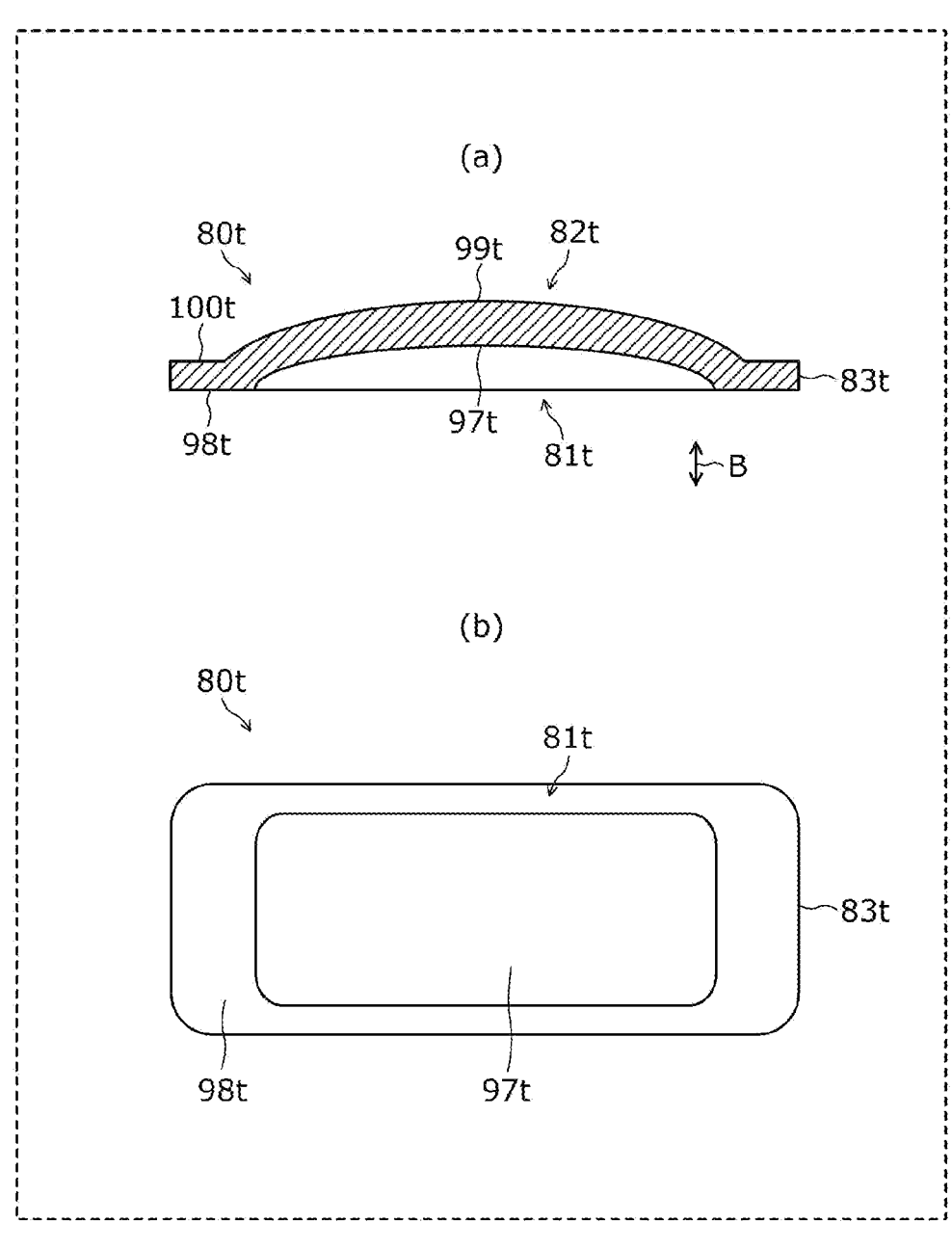
FIG. 23 is a schematic diagram of an optical element and the like according to Embodiment 19.

FIG. 23 is a schematic diagram of optical element 80t according to Embodiment 19. (a) in FIG. 23 illustrates the cross-section of optical element 80t, and (b) in FIG. 23 illustrates optical element 80t viewed from a side where first face 81t lies.

Optical element 80t includes first face 81t, second face 82t that faces first face 81t, and side face 83t that links first face 81t and second face 82t. Optical element 80t is provided such that light is emitted from a display, enters optical element 80t through first face 81t, and then is reflected from second face 82t to be guided to the outside of optical element 80t through first face 81t.

First face 81t includes curved portion 97t and flat portion 98t. Curved portion 97t is curved toward second face 82t. Flat portion 98t is connected to the edge portion of curved portion 97t and has a flat shape. Flat portion 98t is orthogonal to direction B in which first face 81t and second face 82t face each other.

Second face 82t includes curved portion 99t and flat portion 100t. Curved portion 99t is curved away from first face 81t. Flat portion 100t is connected to the edge portion of curved portion 99t and has a flat shape. Flat portion 100t is parallel to flat portion 98t.

For example, the optical device according to this embodiment includes fixing structure 120d (see FIG. 8), and fixing structure 120d holds and fixes optical element 80t by pressing flat portion 98t with first face presser 121d and by pressing flat portion 100t with second face presser 127d.

The optical device according to Embodiment 19 has been described above.

As described above, in the optical device according to Embodiment 19, first face 81t includes curved portion 97t and flat portion 98t connected to the edge portion of curved portion 97t, and first face presser 121d presses flat portion 98t.

With this, even if first face 81t includes curved portion 97t, optical element 80t can be held from different sides to be fixed when flat portion 98t is pressed. This easily prevents a reduction in the quality of the image displayed by the optical device.

Note that, in addition to fixing structure 120d in FIG. 8, this embodiment may be combined with any of fixing structures 120i and 120j of optical element 80 illustrated in FIGS. 14 and 15, respectively, and fixing structure 120k of optical element 80f illustrated in FIG. 16. In this case, optical element 80t is pressed and fixed in all directions including the up-down and left-right directions when viewed from the side where first face 81t lies in FIG. 23 and the depth direction (front-back direction, i.e., direction B in FIG. 23). At this moment, for example, second face presser 127d having flexibility and fixing structure 120i, 120j, or 120k having elasticity can eliminate or minimize the effect of the thermal expansion and vibration of optical element 80t in all directions on the image.

It should be noted that the "pressing" of the pressers in the above-described embodiments does not mean pushing movement only, but should be broadly interpreted, for example, as supporting, retaining, or abutting the faces of the optical element to be held from different sides.

Other Embodiments

Although an optical device according to one or more aspects of the present disclosure has been described based on embodiments, the present disclosure is not limited to the embodiments. Those skilled in the art will readily appreciate that embodiments arrived at by making various modifications to the above embodiments or embodiments arrived at by selectively combining elements disclosed in the above embodiments without materially departing from the scope of the present disclosure may be included within one or more aspects of the present disclosure.

Embodiment 1 described above is provided with reflective mirror 60 but is not necessarily limited to this configuration. For example, reflective mirror 60 may not be provided, and the light emitted from display 40 may directly enter optical element 80. Moreover, for example, more than one reflective mirror may be provided, and the light emitted from display 40 may enter optical element 80 after being reflected multiple times. This also applies to Embodiments 2 to 19.

(Supplementary Note)

The above-described embodiments and the like disclose the following techniques.

(Technique 1)

An optical device includes:

a display;

an optical element that includes a first face and a second face facing the first face, the optical element receiving light from the display through the first face, reflecting the received light on the second face, and emitting the reflected light through the first face;

a housing that accommodates the display and the optical element; and a fixing structure that fixes the optical element by holding the optical element from different sides of the optical element.

(Technique 2)

The optical device according to technique 1, wherein the optical element includes a side face that links the first face and the second face, and the fixing structure includes a first face presser provided for the housing and at least one of a second face presser or a side face presser, the first face presser pressing an edge portion of the optical element from a side where the first face lies when the optical element is viewed from the side where the first face lies, the second face presser pressing the optical element from a side where the second face lies, the side face presser pressing the optical element from a side where the side face lies.

(Technique 3)

The optical device according to technique 2, wherein the side face includes a first side portion and a second side portion that faces the first side portion, the fixing structure includes the side face presser, and the side face presser includes a first side portion presser that presses the optical element from a side where the first side portion lies and a second side portion presser that presses the optical element from a side where the second side portion lies.

(Technique 4)

The optical device according to technique 3, wherein the second side portion is inclined with respect to the first side portion to be away from the first side portion as the second side portion is closer to the first face than the second face, the first side portion presser presses the first side portion, and the second side portion presser presses the second side portion.

(Technique 5)

The optical device according to technique 4, wherein the first side portion is an upper face portion of the optical element when the optical element is viewed from the side where the first face lies, and the first side portion presser presses the first side portion from above the optical element when the optical element is viewed from the side where the first face lies.

(Technique 6)

The optical device according to technique 4, wherein the first side portion is an upper face portion of the optical element when the optical element is viewed from the side where first face lies, the side face includes a third side portion and a fourth side portion, the third side portion being connected to a left end of the first side portion and located further leftward as the third side portion is closer to the second side portion when the optical element is viewed from the side where the first face lies, the fourth side portion being connected to a right end of the first side portion and located further rightward as the fourth side portion is closer to the second side portion when the optical element is viewed from the side where the first face lies, and the side face presser includes at least one of a third side portion presser that presses the third side portion from above the optical element when the optical element is viewed from the side where the first face lies or a fourth side portion presser that presses the fourth side portion from above the optical element when the optical element is viewed from the side where the first face lies.

(Technique 7)

The optical device according to any one of techniques 2 to 6, wherein the fixing structure includes the second face presser, and the second face presser is in surface contact with the second face to press the second face.

(Technique 8)

The optical device according to any one of techniques 2 to 7, wherein the first face presser includes three or more edge pressers each pressing an edge portion of the first face.

(Technique 9)

The optical device according to any one of techniques 2 to 7, wherein the first face presser presses an edge portion of the first face around an entire circumference of the first face.

(Technique 10)

The optical device according to any one of techniques 2 to 9, wherein the fixing structure includes the second face presser, and the first face presser and the second face presser mutually hold the optical element in directions in which the first face and the second face face each other.

(Technique 11)

The optical device according to any one of techniques 2 to 10, wherein at least one of the second face presser or the side face presser has flexibility.

(Technique 12)

The optical device according to any one of techniques 2 to 11, wherein the fixing structure includes the second face presser, a member with a screw hole, and a screw that presses the second face presser toward the optical element while fitted in the screw hole, and the second face presser presses the optical element by being pressed toward the optical element by the screw.

(Technique 13)

The optical device according to technique 12, wherein the second face presser is integral to the housing.

(Technique 14)

The optical device according to technique 12 or 13, further including a substrate held and fixed between the screw and the member while the screw is fitted in the screw hole may be provided.

(Technique 15)

The optical device according to any one of techniques 2 to 14, wherein the fixing structure includes the second face presser, and the second face presser includes one edge presser that presses one edge portion of the second face, an other edge presser that presses an other edge portion of the second face, and a covering presser that presses the second face while covering the second face between the one edge presser and the other edge presser.

(Technique 16)

The optical device according to any one of techniques 2 to 15, wherein the optical element includes at least one of a first recess provided at an edge portion of the first face or a first protrusion provided at the edge portion of the first face, and the housing includes at least one of a second protrusion that engages with the first recess or a second recess that engages with the first protrusion.

(Technique 17)

The optical device according to any one of techniques 2 to 16, wherein the housing includes a body that accommodates the optical element and a cover that is attached to the body and covers the second face of the optical element, and at least one of the second face presser or the side face presser is provided for the cover.

(Technique 18)

The optical device according to any one of techniques 2, 10, 12, 15, and 17, wherein the fixing structure includes the side face presser, and the side face presser includes an upper presser and at least one of a left presser or a right presser, the upper presser pressing the optical element using an elastic force from above, the left presser pressing the optical element using an elastic force from a left, the right presser pressing the optical element using an elastic force from a right, when the optical element is viewed from the side where the first face lies.

(Technique 19)

The optical device according to any one of techniques 2 to 18, wherein the first face includes a curved portion and a flat portion connected to an edge portion of the curved portion, and the first face presser presses the flat portion.

(Technique 20)

The optical device according to any one of techniques 2 to 19, further including:

a protecting member provided at at least one of a point between the first face and the first face presser, a point between the second face and the second face presser, or a point between the side face and the side face presser.

(Technique 21)

The optical device according to any one of techniques 2 to 20, further including:

a light absorbing member provided at least in a part of the side face.

(Technique 22)

The optical device according to any one of techniques 1 to 21, further including:

a metallic multilayer including a plurality of laminated metallic layers and disposed on the second face.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2022-042245 filed on Mar. 17, 2022, and Japanese Patent Application No. 2022-135020 filed on Aug. 26, 2022.

INDUSTRIAL APPLICABILITY

The present disclosure is applicable to, for example, an optical device including an optical element that reflects light emitted from a display.

The invention claimed is:

1. An optical device comprising:

a display;

an optical element that includes a first face and a second face facing the first face, the optical element receiving light from the display through the first face, reflecting the received light on the second face, and transmitting the reflected light through the first face;

a housing that accommodates the display and the optical element; and a fixing structure that fixes the optical element, wherein:

the optical element includes a side face that links the first face and the second face, the side face includes a first side portion and a second side portion that faces the first side portion, the second side portion is inclined with respect to the first side portion to be away from the first side portion as the second side portion is closer to the first face than the second face, the fixing structure includes:

a first face presser provided to the housing, the first face presser pressing an edge portion of the first face of the optical element, a first side portion presser that presses the first side portion of the optical element, and a second side portion presser that presses the second side portion of the optical element, the first face presser and the second side portion presser have surfaces that are unitarily formed with the housing, and the first side portion presser presses the first side portion of the optical element such that the optical element is pressed against the first face presser and the second side portion presser.

2. The optical device according to claim 1, wherein the first side portion is an upper face portion of the optical element when the optical element is viewed from the side where the first face lies, and the first side portion presser presses the first side portion from above the optical element when the optical element is viewed from the side where the first face lies.

3. The optical device according to claim 1, wherein the first side portion is an upper face portion of the optical element when the optical element is viewed from the side where first face lies, the side face includes a third side portion and a fourth side portion, the third side portion being connected to a left end of the first side portion and located further leftward as the third side portion is closer to the second side portion when the optical element is viewed from the side where the first face lies, the fourth side portion being connected to a right end of the first side portion and located further rightward as the fourth side portion is closer to the second side portion when the optical element is viewed from the side where the first face lies, and the side face presser includes at least one of a third side portion presser that presses the third side portion from above the optical element when the optical element is viewed from the side where the first face lies or a fourth side portion presser that presses the fourth side portion from above the optical element when the optical element is viewed from the side where the first face lies.

4. The optical device according to claim 1, wherein the fixing structure includes the second face presser, and the second face presser is in surface contact with the second face to press the second face.

5. The optical device according to claim 1, wherein
the first face presser includes three or more edge pressers
each pressing an edge portion of the first face.

6. The optical device according to claim 1, wherein
the first face presser presses an edge portion of the first
face around an entire circumference of the first face.

7. The optical device according to claim 1, wherein
the fixing structure includes the second face presser, and
the first face presser and the second face presser mutually
hold the optical element in directions in which the first
face and the second face face each other.

8. The optical device according to claim 1, wherein
at least one of the second face presser or the side face
presser has flexibility.

9. The optical device according to claim 1, wherein
the fixing structure includes
the second face presser,
a member with a screw hole, and
a screw that presses the second face presser toward the
optical element while fitted in the screw hole, and
the second face presser presses the optical element by
being pressed toward the optical element by the screw.

10. The optical device according to claim 1, wherein
the housing includes
a body that accommodates the optical element and
a cover that is attached to the body and covers the
second face of the optical element, and
at least one of the second face presser or the side face
presser is provided for the cover.

11. The optical device according to claim 1, wherein
the fixing structure includes the side face presser, and
the side face presser includes an upper presser and at least
one of a left presser or a right presser, the upper presser
pressing the optical element using an elastic force from
above, the left presser pressing the optical element
using an elastic force from a left, the right presser
pressing the optical element using an elastic force from
a right, when the optical element is viewed from the
side where the first face lies.

12. The optical device according to claim 1, wherein
the first face includes a curved portion and a flat portion
connected to an edge portion of the curved portion, and
the first face presser presses the flat portion.

13. The optical device according to claim 1, further
comprising:
a protecting member provided at at least one of a point
between the first face and the first face presser, a point
between the second face and the second face presser, or
a point between the side face and the side face presser.

14. The optical device according to claim 1, further
comprising:
a light absorbing member provided at least in a part of the
side face.

15. The optical device according to claim 1, further
comprising:
a metallic multilayer including a plurality of laminated
metallic layers and disposed on the second face.

16. The optical device according to claim 1, wherein:
the optical element is pressed against the first face presser
in a first direction, and
the optical element is pressed against the second side
portion presser in a second direction different from the
first direction.

17. The optical device according to claim 1, wherein:
the first side portion is inclined at an angle smaller than a
right angle with respect to the first face that is pressed
by the first face presser.

18. An optical device comprising:
a display;
an optical element that includes a first face and a second
face facing the first face, the optical element receiving
light from the display through the first face, reflecting
the received light on the second face, and transmitting
the reflected light through the first face;
a housing that accommodates the display and the optical
element; and
a fixing structure that fixes the optical element by holding
the optical element from different sides of the optical
element, wherein:
the optical element includes a side face that links the first
face and the second face, and the optical element
includes a first recess provided at an edge portion of the
first face and a first protrusion provided at the edge
portion of the first face,
the fixing structure includes a first face presser provided
for the housing and at least one of a second face presser
or a side face presser, the first face presser pressing an
edge portion of the optical element from a side where
the first face lies when the optical element is viewed
from the side where the first face lies, the second face
presser pressing the optical element from a side where
the second face lies, the side face presser pressing the
optical element from a side where the side face lies,
the first recess and the first protrusion are alternately
arranged along an edge portion of the first face when
the optical element is viewed from the side where the
first face lies, and
the housing includes a second protrusion that engages
with the first recess and a second recess that engages
with the first protrusion.

19. An optical device comprising:
a display;
an optical element that includes a first face formed by a
concave surface and a second face formed by a convex
surface facing the first face, the optical element receiv-
ing light from the display through the first face, reflect-
ing the received light on the second face, and trans-
mitting the reflected light through the first face;
a housing that accommodates the display and the optical
element; and
a fixing structure that fixes the optical element by holding
the optical element from different sides of the optical
element, wherein:
the optical element includes a side face that links the first
face and the second face,
the fixing structure includes a first face presser provided
for the housing and a second face presser, the first face
presser pressing an edge portion of the optical element
from a side where the first face lies when the optical
element is viewed from the side where the first face
lies, the second face presser pressing the optical ele-
ment from a side where the second face lies, and
the second face presser includes one edge presser that
presses one edge portion of the second face, an other
edge presser that presses an other edge portion of the
second face, and a covering presser that presses the
entire second face and covers the entire second face
between the one edge presser and the other edge
presser.

* * * * *